US012031721B2

(12) United States Patent
Babington et al.

(10) Patent No.: US 12,031,721 B2
(45) Date of Patent: Jul. 9, 2024

(54) ATOMIZATION BURNER WITH FLEXIBLE FIRE RATE

(71) Applicant: BABINGTON TECHNOLOGY, INC., Rocky Mount, NC (US)

(72) Inventors: Andrew D. Babington, Potomac Hills, MD (US); Nigel Andrew Jones, Frederick, MD (US); Andrew J. Hamer, Richmond, VA (US); Juan Carlos Lemus, Rocky Mount, NC (US); Per Edman, Norrköping (SE)

(73) Assignee: BABINGTON TECHNOLOGY, INC., Rocky Mount, NC (US)

( * ) Notice: Subject to any disclaimer, the term of this patent is extended or adjusted under 35 U.S.C. 154(b) by 1325 days.

(21) Appl. No.: 16/578,881

(22) Filed: Sep. 23, 2019

(65) Prior Publication Data
US 2020/0096195 A1   Mar. 26, 2020

Related U.S. Application Data

(60) Provisional application No. 62/734,730, filed on Sep. 21, 2018.

(51) Int. Cl.
*F23N 5/00*   (2006.01)
*F23D 11/00*  (2006.01)
(Continued)

(52) U.S. Cl.
CPC .............. *F23N 5/003* (2013.01); *F23D 11/00* (2013.01); *F23N 1/005* (2013.01); *F23N 3/005* (2013.01); *F23N 5/242* (2013.01); *F23N 5/265* (2013.01); *G05B 19/042* (2013.01); *F23D 2202/00* (2013.01); *F23D 2208/10* (2013.01); *F23D 2900/00017* (2013.01); *F23N 2223/08* (2020.01); *F23N 2237/10* (2020.01); *F23N 2237/14* (2020.01); *F23N 2237/16* (2020.01);
(Continued)

(58) Field of Classification Search
USPC ........................................................ 700/274
See application file for complete search history.

(56) References Cited

U.S. PATENT DOCUMENTS

2017/0191660 A1    7/2017  Babington et al.
2017/0198903 A1*   7/2017  Babington .............. F23N 1/022

FOREIGN PATENT DOCUMENTS

DE   43 40 534 A1      6/1995
KR   100857630 B1  *   9/2008

OTHER PUBLICATIONS

European Search Report dated May 17, 2022 issued in corresponding Patent Application No. 19862329.0 (10 pages).

* cited by examiner

*Primary Examiner* — Lindsay M Low
*Assistant Examiner* — Omar Morales
(74) *Attorney, Agent, or Firm* — Polsinelli PC

(57) ABSTRACT

A burner includes an atomizing chamber, a flame tube in front of the atomizing chamber adapted to direct combusting fuel introduced by the atomizing chamber along an interior of the flame tube, and a controller. The controller is programmed to independently control rate of fuel flow to the atomizing chamber, rate of atomizing air flow to the atomizing chamber, and rate of combustion air to the flame tub. The controller is also programmed to perform operations including regulating, based on output of a gas sensor, at least the rate of combustion air to the flame tube to substantially maintain a first predetermined amount of excess air in the flame tube.

20 Claims, 24 Drawing Sheets

(51) Int. Cl.
*F23N 1/00* (2006.01)
*F23N 3/00* (2006.01)
*F23N 5/24* (2006.01)
*F23N 5/26* (2006.01)
*G05B 19/042* (2006.01)

(52) U.S. Cl.
CPC .. *F23N 2239/06* (2020.01); *G05B 2219/2649* (2013.01)

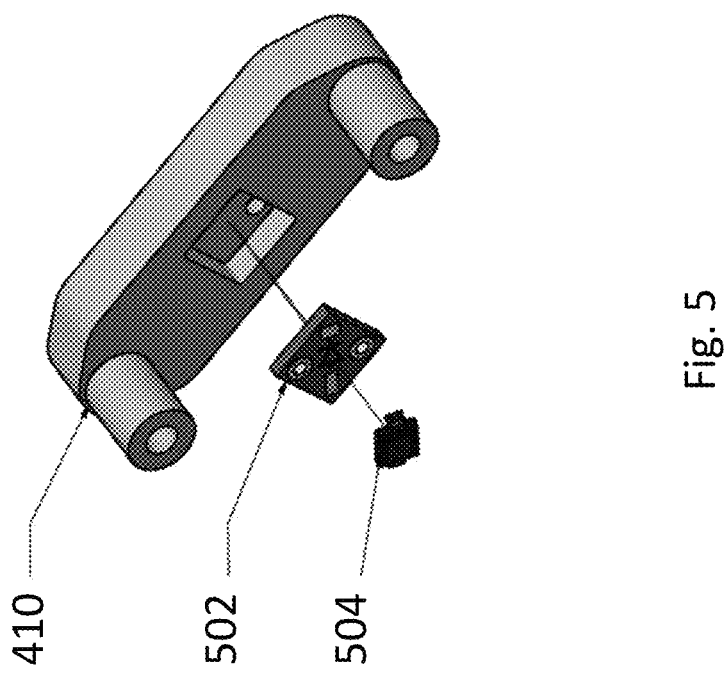
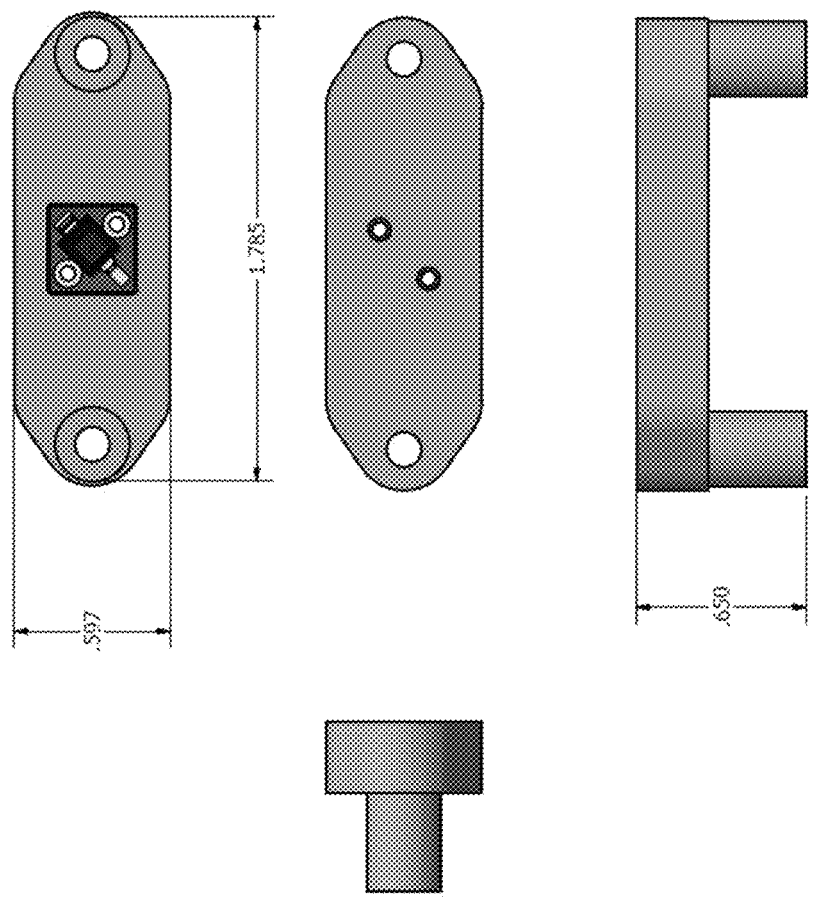
Fig. 5

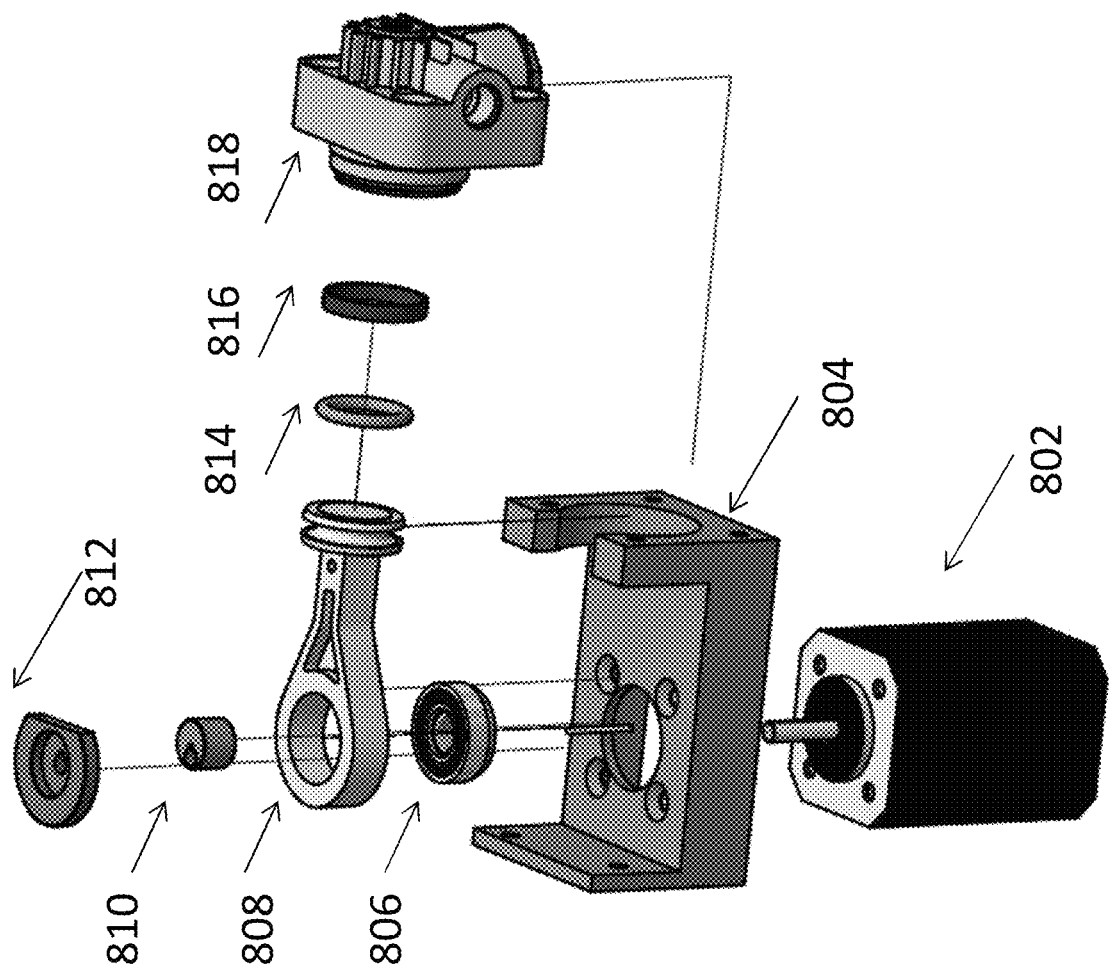
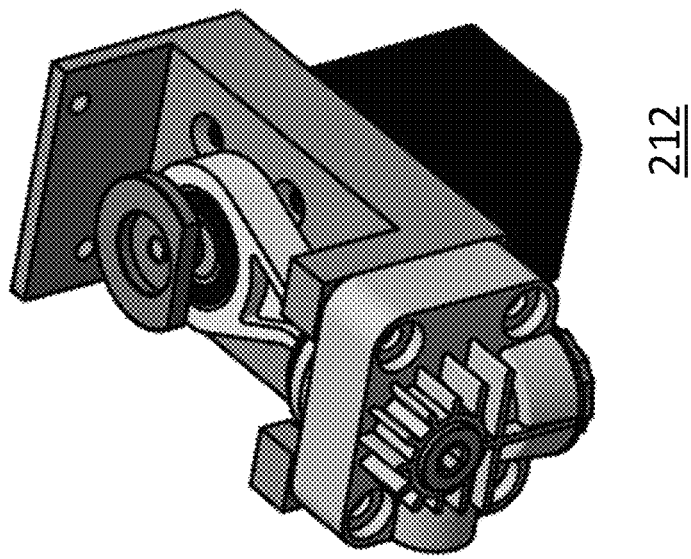
Fig. 8

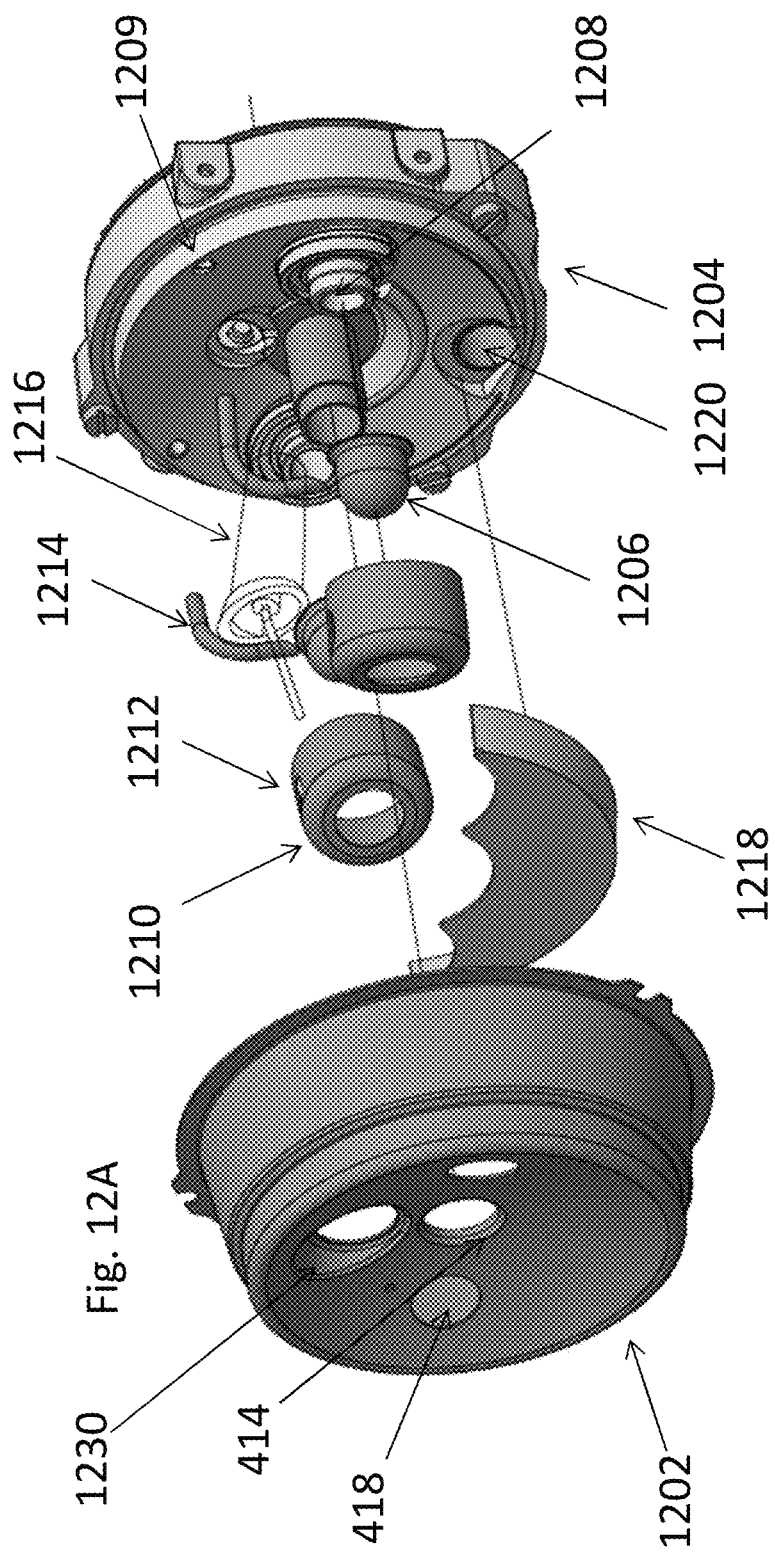

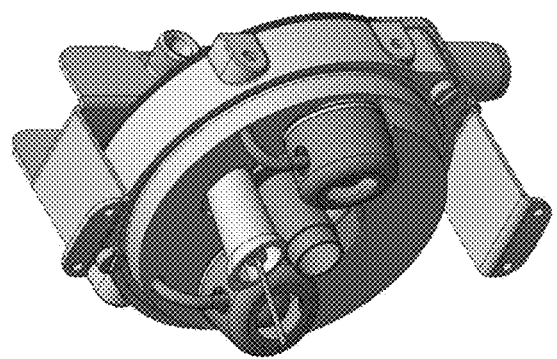
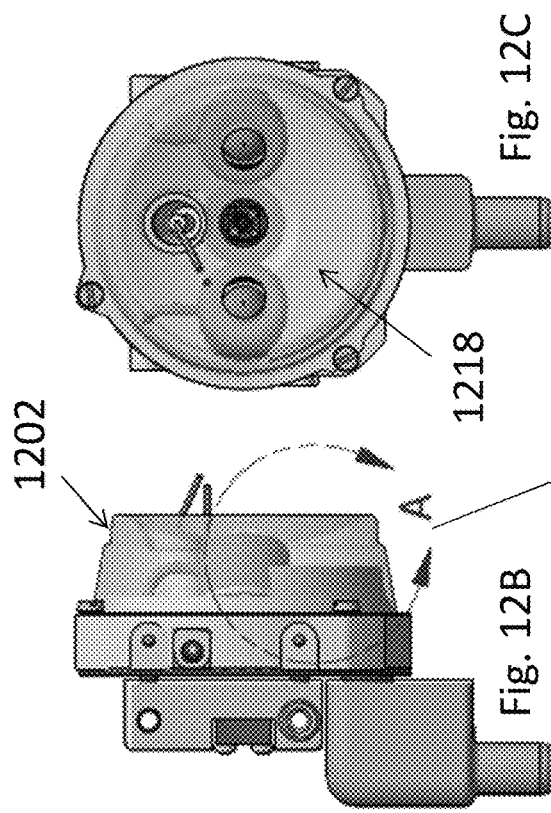
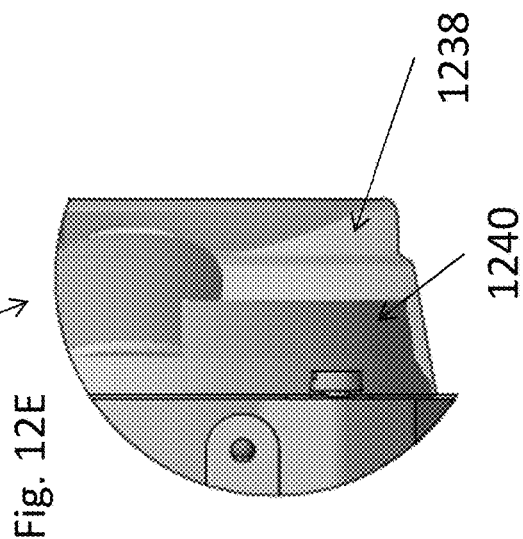

|          | Blower | Fuel |
|----------|--------|------|
| Initial  | 2379   | 343  |
| Final    | 5031   | 710  |
| Change   | 2652   | 367  |

| Ratio | | 13.84 | | | |

| Step | Blower | Blower Change | Fuel | Fuel Change | Fuel to Blower Ratio |
|------|--------|---------------|------|-------------|----------------------|
| 1    | 2479   | 100           | 357  | 14          | 14.4                 |
| 2    | 2579   | 100           | 371  | 14          | 14.4                 |
| 3    | 2679   | 100           | 385  | 14          | 14.4                 |
| 4    | 2779   | 100           | 398  | 14          | 14.3                 |
| 5    | 2879   | 100           | 412  | 14          | 14.3                 |
| 6    | 2979   | 100           | 426  | 14          | 14.3                 |
| 7    | 3079   | 100           | 440  | 14          | 14.3                 |
| 8    | 3179   | 100           | 454  | 14          | 14.3                 |
| 9    | 3279   | 100           | 468  | 14          | 14.3                 |
| 10   | 3379   | 100           | 481  | 14          | 14.2                 |
| 11   | 3479   | 100           | 495  | 14          | 14.2                 |
| 12   | 3579   | 100           | 509  | 14          | 14.2                 |
| 13   | 3679   | 100           | 523  | 14          | 14.2                 |
| 14   | 3779   | 100           | 537  | 14          | 14.2                 |
| 15   | 3879   | 100           | 551  | 14          | 14.2                 |
| 16   | 3979   | 100           | 564  | 14          | 14.2                 |
| 17   | 4079   | 100           | 578  | 14          | 14.2                 |
| 18   | 4179   | 100           | 592  | 14          | 14.2                 |
| 19   | 4279   | 100           | 606  | 14          | 14.2                 |
| 20   | 4379   | 100           | 620  | 14          | 14.2                 |
| 21   | 4479   | 100           | 634  | 14          | 14.1                 |
| 22   | 4579   | 100           | 647  | 14          | 14.1                 |
| 23   | 4679   | 100           | 661  | 14          | 14.1                 |
| 24   | 4779   | 100           | 675  | 14          | 14.1                 |
| 25   | 4879   | 100           | 689  | 14          | 14.1                 |
| 26   | 4979   | 100           | 703  | 14          | 14.1                 |
| 27   | 5031   | 52            | 710  | 7           | 14.1                 |

Fig. 18

ATOMIZATION BURNER WITH FLEXIBLE FIRE RATE

CROSS REFERENCE TO RELATED APPLICATIONS

The instant application claims priority to U.S. Provisional Patent Application 62/734,730 entitled ATOMIZATION BURNER WITH FLEXIBLE FIRE RATE filed on Sep. 21, 2018, the contents of all of which is incorporated by reference herein in its entirety. The instant application also relates to U.S. patent application Ser. No. 15/405,685 entitled ATOMIZATION BURNER WITH FLEXIBLE FIRE RATE filed Jan. 13, 2017, U.S. Provisional Application 62/274,879, entitled SYSTEM AND METHOD FOR DETECTING FLAME WITHIN A BURNER, filed on Jan. 5, 2016, and U.S. Provisional Application 62/278,163, entitled ATOMIZATION BURNER WITH FLEXIBLE FIRE RATE, filed on Jan. 13, 2016, the contents of all of which are incorporated by reference herein in their entireties.

FIELD OF THE INVENTION

Various embodiments described herein relate generally to architecture control of operating characteristics of a burner that can burn diesel, biodiesel and other renewable biofuels. More specifically, various embodiments described herein relate to an adjustable atomizing burner that can vary its output heat of a burner by dynamically adjusting the flows of fuel, combustion air and atomizing air during continuous operation.

BACKGROUND

Fuel burners built consistent with the Babington atomization principle are well known. The methodology mimics the atomization of water over a blowhole of a whale when the whale exhales. In the burner, a thin layer of fuel is poured over a convex surface that has a tiny air hole. Pressurized clean air is forced through the hole, creating a spray so fine that when burned, it creates no smoke, odor or carbon monoxide. By way of non-limiting example, the AIRTRONIC series of burners by BABINGTON TECHNOLOGY operate on this principle. Non-limiting examples of patents that disclose burners built according to this principle include, e.g., U.S. Pat. No. 4,298,338 entitled LIQUID FUEL BURNERS, U.S. Pat. No. 4,507,076 entitled ATOMIZATION APPARATUS AND METHOD FOR LIQUID FUEL BURNERS AND LIQUID ATOMIZERS, or U.S. Pat. No. 8,622,737 entitled PERFORATED FLAME TUBE FOR A LIQUID FUEL BURNER, the contents of which are incorporated herein by reference in their entireties, may be used.

Referring to FIG. 11, an exploded view of the AIRTRONIC burner 1100 is shown. The burner includes a double shafted AC motor 1102 with a fixed speed. AC motor 1102 collectively drives a fuel pump 1104, an atomizing air compressor 1106, and a combustion air blower 1108. Fuel pump 1104 delivers a stream of fuel from a reservoir 1110 to a point above convex heads (not shown) of an atomizing chamber 1111. Air compressor 1106 injects air through a small hole in the heads spraying fuel as it flows over the hole of heads and projects the atomized fuel into flame tube 1116 (a process known as "atomization," thus air compressor 1106 being an "atomizing" air compressor). An ignitor (not shown) ignites the atomized fuel. Combustion air blower 1108 delivers a flow of air to the flame tube 1116 that combusts with the fuel to provide flame and heat, and to carry the heat and combusting fuel out of the flame tube 1116.

In an atomization burner the flow of compressed air, combustion air and fuel must maintain a certain mixture relationship in order to properly combust the fuel. For example, a particular flow of atomizing air can only function with a certain range of fuel flow. Fuel flow in excess of that range is too thick to properly atomize, while fuel flow below that range is so thin that particles are too small to properly combust. Fuel flow above or below that range simply will not combust and/or will sub-optimally combust and generate byproducts (e.g., smoke, odor).

By nature of its design, the AIRTRONIC has constrained flexibility relative to this relationship. The fixed speed of the single AC motor 1102 drives fuel pump 1104, combustion air blower 1108, and atomizing air compressor 1106 at corresponding fixed maximum speeds. The flow of air from the compressor 1106 to atomizer heads (not shown) is not adjustable, which limits the potential range of fuel flow rate as noted above. The flow rate of fuel from fuel pump 1104 has some flexibility to reduce the fuel flow via an adjustable mechanical restrictor in the fuel flow pathway. The flow of combustion air has some greater degree of flexibility, and is manually adjustable via a knob 1109 to physically restrict the air pathway from combustion air blower 1108 to flame tube 1116. This design combusts fuel at a rate of 0.45-0.55 gallons per hour ("GPH"), although approximately 0.4-0.6 GPH is the theoretical range limit with this particular geometric configuration.

In recent years a market has emerged for portable cooking and heating appliances to cook for significant numbers of people at locations that do not have access to working kitchen facilities. For example, disaster relief operations need transportable kitchen appliances to bring to disaster zones and relief centers. Military units need kitchen appliances to support operations as personnel are deployed or relocate base camp. Restaurants and caterers may wish to cook at remote locations, such as beaches, wooded areas, street fairs, etc. A need therefore exists for portable and/or mobile kitchen appliances.

A difficulty with portable and/or mobile kitchen appliances is that it can be difficult to obtain specific types of fuel in such circumstances as well as operate on reliable and sufficient electrical power. For example, if the transporting vehicle runs on gasoline and the cooking appliances run off propane, then there is a need to store, transport and maintain a supply of two different fuels. Gasoline and propane are also volatile fuels and dangerous to transport and store in the field. Organizations that provide such services therefore prefer that kitchen appliances and the vehicles that transport them consume the same type of fuel. Liquid distillate fuel, such as diesel as burned by the AIRTRONIC, is preferred. Applicants have several patents and applications to utilize a burner such as the AIRTRONIC in connection with portable cooking appliances, such as U.S. Pat. No. 8,499,755 entitled MOBILE KITCHEN, U.S. Pat. No. 7,798,138 entitled CONVECTION OVEN INDIRECTLY HEATED BY A FUEL BURNER, the contents of which are incorporated by reference herein in their entireties.

Use of the AIRTRONIC with portable cooking and/or heating appliances has a variety of drawbacks.

One drawback is that even at its minimal fuel flow rate the AIRTRONIC produces more heat than necessary for particular cooking apparatus. Some cooking appliances need to be overbuilt to withstand this heat output, which makes the appliance expensive to manufacture, heavy and energy inefficient. By way of non-limiting example, an oven as shown in U.S. Pat. No. 7,798,138 that could withstand the heat output of the AIRTRONIC weighs on the order of 800 lbs., which limits its portability options.

It is also difficult to change the temperature of the appliance. The overbuilt nature of the appliance needed to withstand the excessive heat output has a corresponding large specific heat, which makes the appliance slow to heat (wasting time and fuel) and slow to cool (potentially overcooking food). By way of non-limiting example, a chef may want to instantaneously reduce a stockpot cooker from a HIGH setting (e.g., to boil) to LOW setting (e.g., to simmer), but this takes several minutes even if the burner is turned off because the stockpot cooker itself has a high specific heat that retains the original high heat from the HIGH setting and only slowly cools.

It is also difficult to control the appliance temperature. The AIRTRONIC controls heat output via the "bang-bang" methodology, in that it is turned ON or OFF as appropriate to reach/maintain a desired temperature, also known as duty cycling. However, the AIRTRONIC takes 20-30 seconds to turn ON, and 90-120 seconds to turn OFF. By way of non-limiting example, in an oven preheated to 400°, even if the burner is turned OFF when the oven reaches 400° the burner continues to output heat. The oven will thus overshoot its preheat target to a higher temperature, and the specific heat of the appliance will slow the transition from the higher temperature to the desired preheat temperature.

The AIRTRONIC also consumes a considerable amount of power to operate because when active the components are at maximum flow speeds. Any adjustment in flow rates as noted above is due to physical impediments from restrictors in the flow pathways which can reduce flow but do not reduce power consumption. This level of power consumption is undesirable given the limited availability of power in the environments that would utilize portable cooking appliances.

U.S. patent application Ser. No. 15/405,685 discloses an alternative to the AIRTRONIC. The design is based on the provision of different DC motors for independent delivery of combustion air, atomization air, and fuel. The embodiments disclosed therein can combust any multi-fuel with less heat, less fuel, and lower power than the AIRTRONIC.

Use of the some of the embodiments of U.S. patent application Ser. No. 15/405,685 with biodiesel has a variety of drawbacks. One such obstacle is that over time partially oxidized hydrocarbons were observed to accumulate inside the atomizing chamber, which can clog the device.

Another obstacle is the influence of excess air flow. Excess air is expressed as a percentage of theoretical air required to complete combustion. Thus, 10% excess air indicates that 110% total air is being supplied to the burner. Excess air flow in burners is a balancing act between efficiency and safety. With respect to efficiency, higher excess air translates to lower efficiency with higher costs (e.g., akin to a low mileage per gallon car). There is thus an interest in burner designs that operate at lower excess air output.

With respect to safety, all burners produce some levels of toxic gases, particularly carbon monoxide. Per federal law 35 PPM is the maximum concentration of carbon monoxide allowed for continuous exposure over an eight-hour period. In burners, excess air flow at 15% or below tends to generate over 40 PPM, and small reductions in excess air below 15% substantially increases the production of carbon monoxide; this effect is known as "turn up."

For example, FIG. 22 shows a graph of carbon monoxide emissions consistent with of a burner of embodiments herein combusting diesel fuel at different excess air levels. At 45% excess air, the burner outputs about 3 PPM carbon monoxide which is not dangerous, and a drop by 10% to 35% excess air produced about 4 PPM carbon monoxide—a nominal increase. By way of comparison, at 25% excess air, the burner outputs about 12 PPM carbon monoxide which is not dangerous, and a drop by 10% to 15% substantially increased the carbon monoxide to a potentially dangerous 100 PPM. Burners must be designed and operated to maintain excess air levels that avoid this turn up region (e.g., above about 15%).

From a theoretical perspective, burner operation would be most efficient just outside of the turn up region, e.g., slightly above about 15%. As a practical matter burner design/ operation needs to be set well above that turn up region to account for variances in the burner design, operation, and lifespan conditions.

By way of example, one variance is the burner's mechanical design itself. Even burners manufactured to the same specifications and which consume the same diesel fuel will tend to produce different amounts of excess air. A contributing factor is that the burner's fuel system design results in a significant amount of control gain such that even minor differences within the manufacturing margin of error between burners can result in significant variations in excess air flow output. Thus two burners might be built to the same specifications, set to the same parameters and consume the same fuel, but one burner produces 10% more or less excess air flow than the other. Thus, to account for a 10% mechanical variance relative to a 15% minimum, about 25% excess air could be needed.

Another source of variance is a safety margin to account for changes in the environment, such as damage, wear and tear from age, and exposure to pollutants. By way of non-limiting example, pet hair from a house with a multitude of pets can collect in a burner and induce a variance of upwards of about 10% in excess air. In combination with a 10% mechanical variance discussed above, at least about 35% excess air could be the minimal setting to avoid reaching the turn up region (35%≥10% mechanical variance+10% safety variance+15% minimum).

Another source of variance is renewable biofuels or biodiesel fuel. Unlike diesel fuel, biodiesel may include significant oxygen content that adds to the presence of excess air, but there is no standard as to how much oxygen is present in any particular grade of biodiesel. The oxygen content may differ based on biodiesel grade, manufacturer, and even age; a batch of a grade of biodiesel from a particular manufacturer may have different oxygen content from the next batch that is made by that same manufacturer.

It is also common at the point of consumption to mix different biodiesels together. This is akin to a car having ⅔ tank of SHELL brand 93 octane gasoline and then adding ⅓ of a tank of EXXON brand 89 octane gasoline, consuming half that tank and then later adding half a tank of SUNOCO brand 91 octane gasoline; the nature of the gas is the tank is no longer truly known, and if the car requires 91 octane or above the partial presence of 89 octane may be problematic. Thus for example if a burner is set to run B50 biodiesel with its range of oxygen content and diesel fuel was added to the tank, then the amount of excess air would drop.

The resulting variance in excess air from biodiesel can be on the order of 20%. In combination with a 10% mechanical variance and 10% environmental variance discussed above, at least about 55% excess air could be the minimal setting to avoid reaching the turn up region (55%≥20% biodiesel variance+10% mechanical variance+10% safety variance+15% minimum). Some tuning at the point of manufacture or installation may reduce some of this variance, but not for variance based on type of fuel. Compared to 35% excess air, 55% excess air would reduce efficiency by about 1.5%.

DRAWINGS

Various embodiments in accordance with the present disclosure will be described with reference to the drawings, in which:

FIG. 5 shows the support and photodiode of FIG. 2.

FIG. 8 shows the compressor of FIG. 2.

FIGS. 12A-12E show views of an atomizing chamber of FIG. 2.

FIG. 18 shows an embodiment of a table of steps for transition a burner between different operating states.

DETAILED DESCRIPTION

Figure 1:
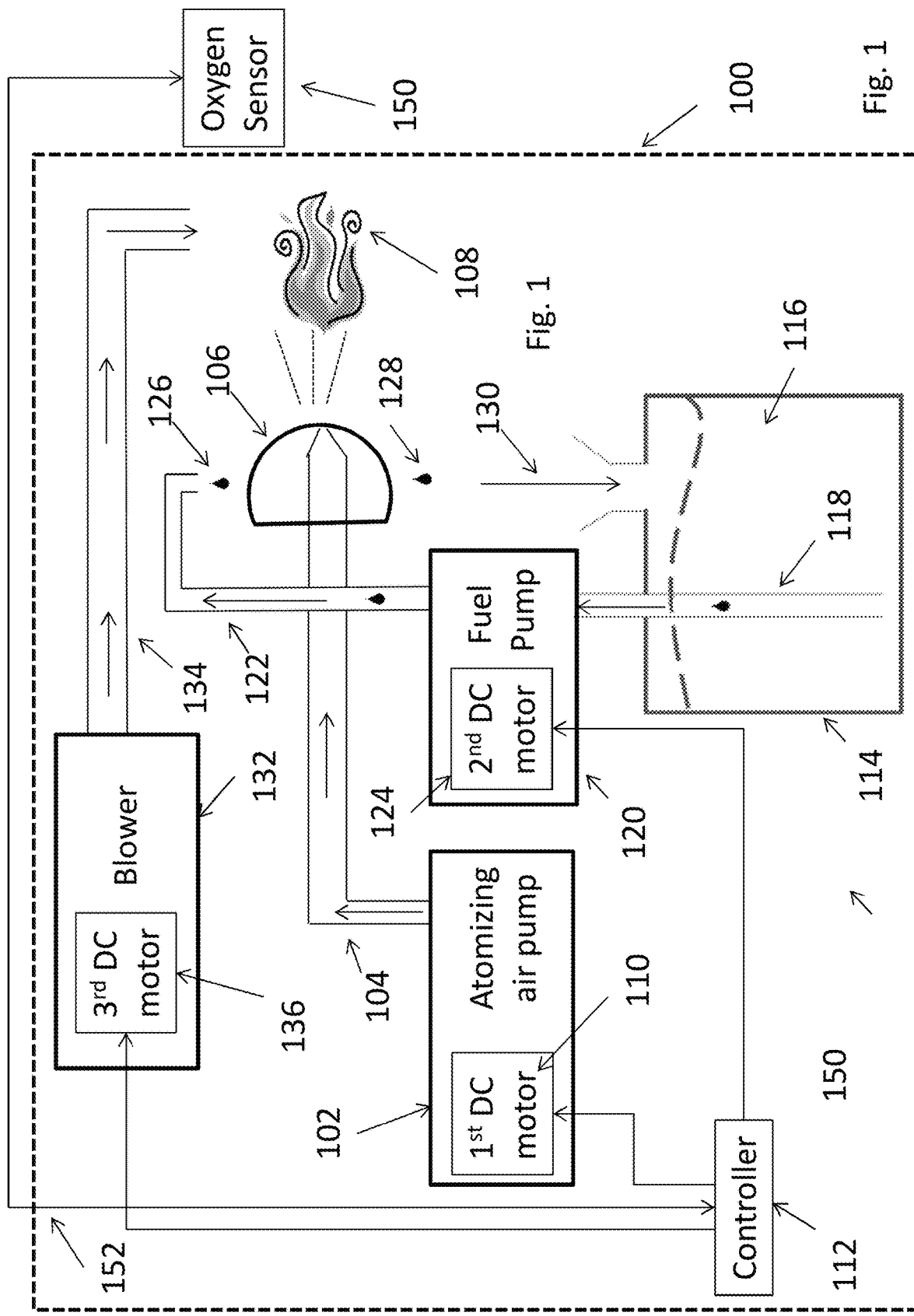
FIG. 1 shows an embodiment of the invention.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized means "including, but not necessarily limited to"; it specifically indicates open-ended inclusion or membership in the so-described combination, group, series and the like. The term "a" means "one or more" unless the context clearly indicates a single element. The term "about" when used in connection with a numerical value means a variation consistent with the range of error in equipment used to measure the values, for which a relative ±5% may be expected (for percentages, relative is off the base such that 30%±5% would be 28.5%-31.5%, whereas absolute is an adder such that 30%±5% would be 25-35%). "First," "second," etc., re labels to distinguish components or blocks of otherwise similar names, but does not imply any sequence or numerical limitation.

As used herein, the term "front", "rear", "left," "right," "top" and "bottom" or other terms of direction, orientation, and/or relative position are used for explanation and convenience to refer to certain features of this disclosure. A "front" of a burner generally refers to the side of the burner from which flame emerges. However, these terms are not absolute, and should not be construed as limiting this disclosure.

All temperatures herein are in Fahrenheit unless otherwise specified.

Shapes as described herein are not considered absolute. As is known in the burner art, surfaces often have waves, protrusions, holes, recesses, etc. to provide rigidity, strength and functionality. All recitations of shape (e.g., cylindrical) herein are to be considered modified by "substantially" regardless of whether expressly stated in the disclosure or claims, and specifically accounts for variations in the art as noted above.

"Excess air" is a percentage of theoretical air required to complete combustion. Thus, 10% excess air indicates that 110% total air to complete combustion is being supplied to the burner. Since oxygen in the air is the basis of combustion, the amount of excess air is a representation of the amount of excess oxygen relative to the amount needed to complete combustion.

"Target set of burner parameters" refers to a set of burner parameters to be used by the burner in the presence of feedback from a functioning gas sensor to maintain a target amount of gas. The set may include subsets that are specific to other conditions and needs of the system. By way of non-limiting example, there may be sets for an oven that are different from sets for a grill. Different temperatures or heat outputs may have their own sets (e.g., the burner parameters to reach and/or hold an oven at about a first gas level at 350° may be different than the burner parameters to reach and/or hold an oven at about the first gas level at 500°).

"Default set of burner parameters" refers to a set of burner parameters to be used by the burner in the absence of reliable feedback from a functioning gas sensor to maintain a level of gas that ensures that the burner variances will not drive the burner into the turn up region and produce unsafe levels of toxic gas. The set may include subsets that are specific to other conditions and needs of the system. By way of non-limiting example, there may be sets for an oven that are different from sets for the grill. Different temperatures or heat outputs may have their own sets (e.g., the burner parameters to reach and/or hold an oven at a first gas level at 350° may be different than the burner parameters to reach and/or hold an oven at the first gas level at) 500°.

"Regulating," "regulation" or the like refers to maintaining a stable/substantially constant flow based on feedback to detect deviation from the target flow and changing parameters to return the flow to the target value. As understood in the art, a regulated parameter is not a constant but will change over time, and regulation adjusts for deviations to maintain an overall stable and substantially constant flow. How far the parameter can deviate before corrective efforts are engaged as well as the corresponding precision on "substantially constant" will be defined by the programming of the regulator (e.g., how much deviation is acceptable) and the precision of the components used. A non-limiting example of regulating herein is monitoring the excess air output from a burner relative to a target excess air and adjusting burner parameters to compensate for the deviation to return to the target air flow. In a non-limiting example, if the target air flow was 35% and the actual air flow was 38%, then regulation would change the burner parameters to reduce excess air flow back to 35%; similarly if the actual air flow was 32%, then regulation would change the burner parameters to increase excess air flow back to 35%. Absolute variation of ±5% (e.g., for a 35% target excess air, regulating to within 30-40%) is a non-limiting example of substantially constant, although smaller (e.g., ±3%) or larger variances (e.g., up to ±15%) may be acceptable within the system. In the specific context of excess air, the resulting lower boundary with the variation would be high enough not to allow for the creation of dangerous levels of toxic gases.

"Heating appliance" "appliance" or the like means any device that receives heat from a burner for cooking (e.g., oven, griddle, range), sanitation (e.g., dishwasher, heated sink basin) or climate (e.g., a furnace), as well as combinations thereof.

As discussed in more detail below, the gas sensor may be an oxygen sensor, and the level of gas is excess air. Other non-limiting examples include carbon monoxide sensor or carbon dioxide sensor. For ease of discussion the embodiments herein are with respect to an oxygen sensor and excess air, although the invention is not limited thereto.

According to an embodiment of the invention, a burner is provided. The burner includes an atomizing chamber, a flame tube in front of the atomizing chamber adapted to direct combusting fuel introduced by the atomizing chamber along an interior of the flame tube, and a controller. The controller is programmed to independently control rate of fuel flow to the atomizing chamber, rate of atomizing air flow to the atomizing chamber, and rate of combustion air to the flame tube. The controller is also programmed to perform operations including regulating, based on output of a gas sensor, at least the rate of combustion air to the flame tube to substantially maintain a first predetermined amount of excess air in the flame tube.

The above embodiment may have various optional features. The controller may be further programmed to perform operations including: increasing, in response to an absence of reliable output from the gas sensor, the at least the rate of combustion air to the flame tube to transition to a second predetermined amount of excess air in the flame tube, the second predetermined amount of air being higher than the first predetermined amount of excess air; regulating, after the increasing, at least the rate of combustion air to the flame tube to maintain the second predetermined amount of excess air in the flame tube. The burner may include a blower that provides combustion air to the flame tube, and the independently controlling the control the rate of combustion air to the flame tube comprises controlling speed of the blower. The controller may be further programmed to perform operations including: increasing, in response to an absence of reliable output from the gas sensor, the speed of the blower to transition to a second predetermined amount of excess air in the flame tube that is higher than the first predetermined amount of excess air; regulating, after the increasing, the speed of the blower to maintain the second predetermined amount of excess air in the flame tube; where the increasing the speed of the blower is determined by new blower speed=prior blower speed×(second predetermined excess air flow/first predetermined excess air flow). The gas sensor may be an oxygen sensor, a carbon monoxide sensor or carbon dioxide sensor. A non-transitory computer readable medium may storing at least a target set of burner parameters and a corresponding default set of burner parameters, where the regulating includes first driving the burner based on the target set of burner parameters in the presence of reliable output from the gas sensor; and second driving the burner based on the corresponding default set of burner parameters in the absence of reliable output from the gas sensor, where the target set of burner parameters refers to a set of burner parameters to be applied to the burner under a first set of conditions in the presence of reliable output from the gas sensor, the target set of burner parameters including the first predetermined amount of excess air, the corresponding default set of burner parameters refers to a set of burner parameters to be applied by the burner in the absence of reliable output from the gas sensor to, the target set of burner parameters including a second predetermined amount of excess air higher than the first predetermined amount of excess air. The regulating may include first transitioning, in response loss of reliable output from the gas sensor, from the first driving to the second driving, and/or second transitioning, in response resumption of reliable output from the gas sensor, from the second driving to the first driving. The regulating may comprise detecting that the amount of excess air flow in the flame tube deviates from the first predetermined amount of excess air by more than a predetermined tolerance, and changing, in response to the detecting, at least the rate of combustion air to drive the amount of excess air in the flame tube toward the first predetermined amount of excess air. The predetermined tolerance may be zero, or absolute ±3%. The first predetermined amount of excess air may be about 35%, and the second predetermined amount of excess air may be about 50%. The gas sensor may be located in the flame tube. A heating appliance may be connected to the burner and configured to receive heat of combustion from the burner, and the gas sensor being located in the heating appliance.

According to another embodiment of the invention, a method for controlling a burner is provided. The burner includes an atomizing chamber, a flame tube in front of the atomizing chamber, adapted to direct combusting fuel introduced by the atomizing chamber along an interior of the flame tube, and a controller programmed to independently control rate of fuel flow to the atomizing chamber, rate of atomizing air flow to the atomizing chamber, and rate of combustion air to the flame tube. The method comprises: first regulating, based on output of a gas sensor, at least the rate of combustion air to the flame tube to substantially maintain a first predetermined amount of excess air in the flame tube; increasing, in response to an absence of reliable output from the gas sensor, the at least the rate of combustion air to the flame tube to transition to a second predetermined amount of excess air in the flame tube, the second predetermined amount of air being higher than the first predetermined amount of excess air; and second regulating, after the increasing, at least the rate of combustion air to the flame tube to maintain the second predetermined amount of excess air in the flame tube.

The above embodiment may have various option features. The method may include: storing at least a target set of burner parameters and a corresponding default set of burner parameters; the first regulating comprises first driving the burner based on the target set of burner parameters in the presence of reliable output from the gas sensor; and the second regulating comprises second driving the burner based on the corresponding default set of burner parameters in the absence of reliable output from the gas sensor; wherein the target set of burner parameters refers to a set of burner parameters to be applied to the burner under a first set of conditions in the presence of reliable output from the gas sensor, the target set of burner parameters including the first predetermined amount of excess air; and wherein the corresponding default set of burner parameters refers to a set of burner parameters to be applied by the burner in the absence of reliable output from the gas sensor to, the target set of burner parameters including a second predetermined amount of excess air higher than the first predetermined amount of excess air. The method may include: decreasing, in response to a resumption of reliable output from the gas sensor, the at least the rate of combustion air to the flame tube to transition to the first predetermined amount of excess air in the flame tube; and resuming, after the decreasing, the first regulating.

According to another embodiment of the invention, a burner is provided. The burner includes a fuel pump, an atomizing air pump, and a combustion air blower, and an atomizing chamber defined in part by a back plate and a front cover. The atomizing chamber includes: first and second atomizing heads positioned to receive fuel flow delivered by the fuel pump and to atomize fuel flow with air delivered by the atomizing air pump; an intermediate plate positioned between the front cover and the back plate, and at least partially below the first and second atomizing heads; the intermediate plate and the front cover being spaced apart to define an air gap; the intermediate plate and the back plate at least partly defining a fuel collection area to catch excess fuel flowing over first and second atomizing heads. A flame tube is in front of the atomizing chamber, adapted to direct combusting fuel introduced by the atomizing chamber along an interior of the flame tube. The air gap acts as an insulator and the intermediate plate acts as a heat shield to collectively protect the fuel collection area from heat of combustion within a rear portion of the flame tube.

The above embodiment may have various optional features. The burner may include first and second caps over the first and second atomizing heads, respectively, each of the first and second caps having: an inlet for receiving fuel flow delivered by the fuel pump; and an outlet being positioned above the fuel collection area such that the outlet directs excess fuel flowing over first and second atomizing heads into the fuel collection area. The intermediate plate may be attached to the back plate. A top surface of the intermediate plate may have first and second curves below the first and second atomizing heads. The back plate may have a hole therein to pass light from the flame tube to electronic components rearward of the back plate, and the top surface of the intermediate plate may have a third curve below the hole. The burner may include in the flame tube air louvers to laterally inject air into the flame tube to create a swirling motion, and the at least one hole rearward of the air louvers to inject combustion air into the rear of the flame tube. The air gap and the intermediate plate sufficiently protect the fuel collection area from the heat of combustion in the flame tube caused by combustion air through the at least one hole rearward of the air louvers to prevent formation of oxidized hydrocarbons in the atomizing chamber. The air gap and the intermediate plate sufficiently protect the fuel collection area from the heat of combustion in the flame tube to prevent formation of oxidized hydrocarbons in the atomizing chamber.

According to another embodiment of the invention, a burner is provided. The burner includes a fuel pump, an atomizing air pump, a combustion air blower, an atomizing chamber that receives fuel flow delivered by the fuel pump and to atomize fuel flow with air delivered by the atomizing air pump, and a flame tube in front of the atomizing chamber adapted to combust fuel with air delivered by the combustion air blower and to direct combusting fuel introduced by the atomizing chamber along an interior of the flame tube. The flame tube has an inner cylinder around an outer cylinder with an air gap in between, the inner cylinder being at least one sheet of rolled metal with opposing ends attached by a first strip of metal, and the first strip of metal extending along a longitudinal axis of the inner cylinder, having a first section attached to the inner cylinder, and a free end and a bent portion between the first section and the free end. The bent portion acts as a spring to capture stress from thermal expansion and contraction of the first strip of metal.

The above embodiment may have various optional features. The bent portion may have a V-shape. There may be a second strip of metal extending along a circumference of the inner cylinder, having a first section and second section attached to the inner cylinder, and a third portion extending over at least a portion of the free end of the first strip of metal. The inner cylinder may include air louvers to laterally inject air into the flame tube to create a swirling motion, at least one hole rearward of the air louvers to inject combustion air into the rear of the flame tube, and at least one hole at least one hole forward of the air louvers to inject combustion air into the rear of the flame tube.

According to another embodiment of the invention, a method for controlling a burner to increase its turn down ratio is provided. The burner includes a fuel pump, an atomizing air pump, and a combustion air blower. The method includes: first adjusting heat output of the combustion air blower, for a heat output above a first heat output threshold, by substantially linearly adjusting output of the combustion air blower and the fuel pump while maintaining output of the air pump substantially constant; and second adjusting heat output of the combustion air blower, for a heat output below the first heat output threshold, by substantially linearly adjusting output of the blower, the fuel pump and the atomizing air pump; wherein the first heat output threshold represents a minimum heat output that the first adjusting can reach while reliably maintaining combustion in the burner; and wherein burner heat output below the first heat output threshold could not be reliably reached and maintained by maintaining output of the air pump substantially constant, such that substantially linearly adjusting of the atomizing air pump allows the burner to reach a heat output below the first heat output threshold.

According to another embodiment of the invention, a burner is provided. The burner includes a fuel pump, an atomizing air pump, a combustion air blower, an atomizing chamber that receives fuel flow delivered by the fuel pump and to atomize fuel flow with air delivered by the atomizing air pump, a flame tube in front of the atomizing chamber adapted to combust fuel with air delivered by the combustion air blower and to direct combusting fuel introduced by the atomizing chamber along an interior of the flame tube, and a controller. The controller is programmed to perform operations including: adjusting heat output of the combustion air blower, for a heat output above a first heat output threshold, by substantially linearly adjusting output of the blower and the fuel pump while maintaining output of the air pump substantially constant; and second adjusting heat output of the blower, for a heat output below the first heat output threshold, by substantially linearly adjusting output of the blower, the fuel pump and the atomizing air pump; wherein the first heat output threshold is a minimum heat output of the burner that the first adjusting can reach while reliably maintaining combustion in the burner; and wherein burner heat output below the first heat output threshold could not be reliably reached and maintained by maintaining output of the air pump substantially constant, such that substantially linearly adjusting of the atomizing air pump in the second adjusting allows the burner to reach a heat output below the first heat output threshold.

Referring now to FIG. 1, a conceptual drawing of a burner 100 according to an embodiment of the invention is shown. Various components are connected by various pathways which can communicate air and/or liquid, such that all pathways are to be considered fluid pathways. It is to be understood for purposes of the conceptual nature of FIG. 1 that each "pathway" refers generically to a path by which a fluid moves from one point of burner 100 to another, and does not imply any structure or location of the pathway; pathway may not even be a structure at all, as it may simply refer to the path travelled by fluid under gravity.

An atomizing air pump 102, such as an air compressor, is provided to deliver clean air along a pathway 104 to an atomizing chamber supporting at least one atomizing head 106. Atomizing head 106 has a convex surface with an orifice for spray dispensing fuel consistent with the Babington atomization principle. When fuel is poured over atomizing head 106 (as described below) and ignited, the combusting fuel will generate a flame plume 108 laterally in a flame tube (not shown in FIG. 1). Atomizing air pump 102 includes a first adjustable speed DC motor 110, which is controlled by a controller 112 (which may be a microcomputer). Controller 112 thus controls the amount of atomizing air provided by atomizing air pump 102.

A fuel tank 114 is provided with fuel 116 for burner 100, and is preferably located such that the top surface of fuel 116 is below atomizing head 106. An inlet pathway 118 extends from fuel tank 114 to fuel pump 120, and an outlet pathway 122 extends from fuel pump 120 to a point above atomizing head 106. Fuel pump 120 includes a second speed adjustable DC motor 124, which is controlled by controller 112. Controller 112 thus controls the rate of flow of fuel 126 delivered from fuel tank 114 to atomizing head 106.

As is known in the art, the amount of fuel 126 delivered to atomizing head 106 may exceed the amount that is actually ignited by burner 100. Excess fuel 128 falls by gravity along a return pathway 130 which directs the excess fuel 128 back into fuel tank 114.

A blower 132 is provided to deliver clean air for combustion along a pathway 134 to the area in front of and around atomizing head 106, preferably through the interior of the flame tube (not shown). Blower 132 includes a third speed adjustable DC motor 136, which is controlled by controller 112. Controller 112 thus controls the rate of combustion air to feed flame plume 108.

Also shown in FIG. 1 is an oxygen sensor 150, which would be located elsewhere in the appliance being heated by burner 100. Oxygen sensor 150 will determine the amount of oxygen present in air output by burner 100 and send corresponding data to the controller 112. As discussed in more detail below, controller 112 can also control the operation of oxygen sensor 150.

Controller 112 may store in memory various burner parameters to control at least the three motors 110, 124 and 136 and/or corresponding protocols for applying those parameters. For example, there could be a set of burner parameters to run a burner 100 for an oven at its maximum heat output in the presence of functioning oxygen sensor 150, as well as a corresponding default set of burner parameter for the burner 100 of oven at its maximum heat output in the absence of a functioning oxygen sensor 150.

All other circumstances being equal except for functioning oxygen sensor v. lack thereof, the default set of burner parameters would establish a higher amount of excess air. The reason is that a burner needs to operate at an excess air level for which the natural variances of the burner as discussed above would not bring the burner 100 into the turn up region. When the oxygen sensor 150 is absent or not functioning as described herein, there is significant variance in the amount of excess air that requires a high excess air. When the oxygen sensor is functioning as described herein, controller 112 can make near real time adjustments to the burner parameters to compensate for variances in the amount of excess air; some variance still exists, but it will be smaller than the variance in the absence of the oxygen sensor. By way of non-limiting example, in the absence of an oxygen sensor there could be a variance of 35% such that burner parameters that are expected to generate 55% excess air may be selected (55-35>15) as the default set of burner parameters. In the presence of an oxygen sensor and corresponding compensation the variance may be 10%, such that burner parameters could be used that are expected to generate 30% excess air (30-10>15) with superior efficiency. Burner 100 could run at this more efficient level, and if the oxygen sensor was to fail burner 100 could switch to the default set of burner parameters to run at 55% excess air.

In this context, excess air may be either a controlled parameter or a side effect. For example, burner 100 may simply have two sets of burner parameters. One set is for "normal" operation which accounts for the presence of an oxygen sensor and the settings of the three motors as selected by controller 112 are expected to generate a particular (lower) amount of excess air, and another set is "default" operation which accounts for the absence/failure of an oxygen sensor and the settings of the three motors as selected by controller 112 are expected to generate a particular (higher) amount of excess air. In this case the amount of excess air may be a byproduct of the parameters but there is no particular setting to account for it.

In another example, excess air could be a controlled parameter, entered by the user (e.g., 27%, 30%, 35%, etc.), and the burner parameters that are expected to support that are selected.

Each set of default set of burner parameters may be consistent with at least 40% excess air, and particularly at least 45% excess air, although the invention is not so limited.

Each set of target set of burner parameters preferably has a lower excess air value than its corresponding default set of burner parameters for the same operating state. By way of non-limiting example, the lower excess air value may be 5%, 10% or 15% lower than the excess air consistent with default set of burner parameters. For example, the default burner parameters may be consistent with 45% excess air, then burner parameters for the same operating conditions (save influence of oxygen sensor 150) could be 30%

These excess air values are to be considered as goals for burner 100 in optimal operation with no variance. As discussed above, due to the variations the actual amount of excess air from burner 100 can deviate significantly from that target.

The conceptual design of FIG. 1 may be implemented using various known structures for the components. The various fluid pathways may be constructed from hoses, pipes, or segments thereof connected together in a known manner. In the alternative, the various pathways could be drilled through solid material, such as a steel block. In yet another alternative, the various pathways could be partially defined in opposing blocks that form the pathways when the blocks are connected together. Combinations of the above, as well as other connection forming techniques may be used.

Figure 2:
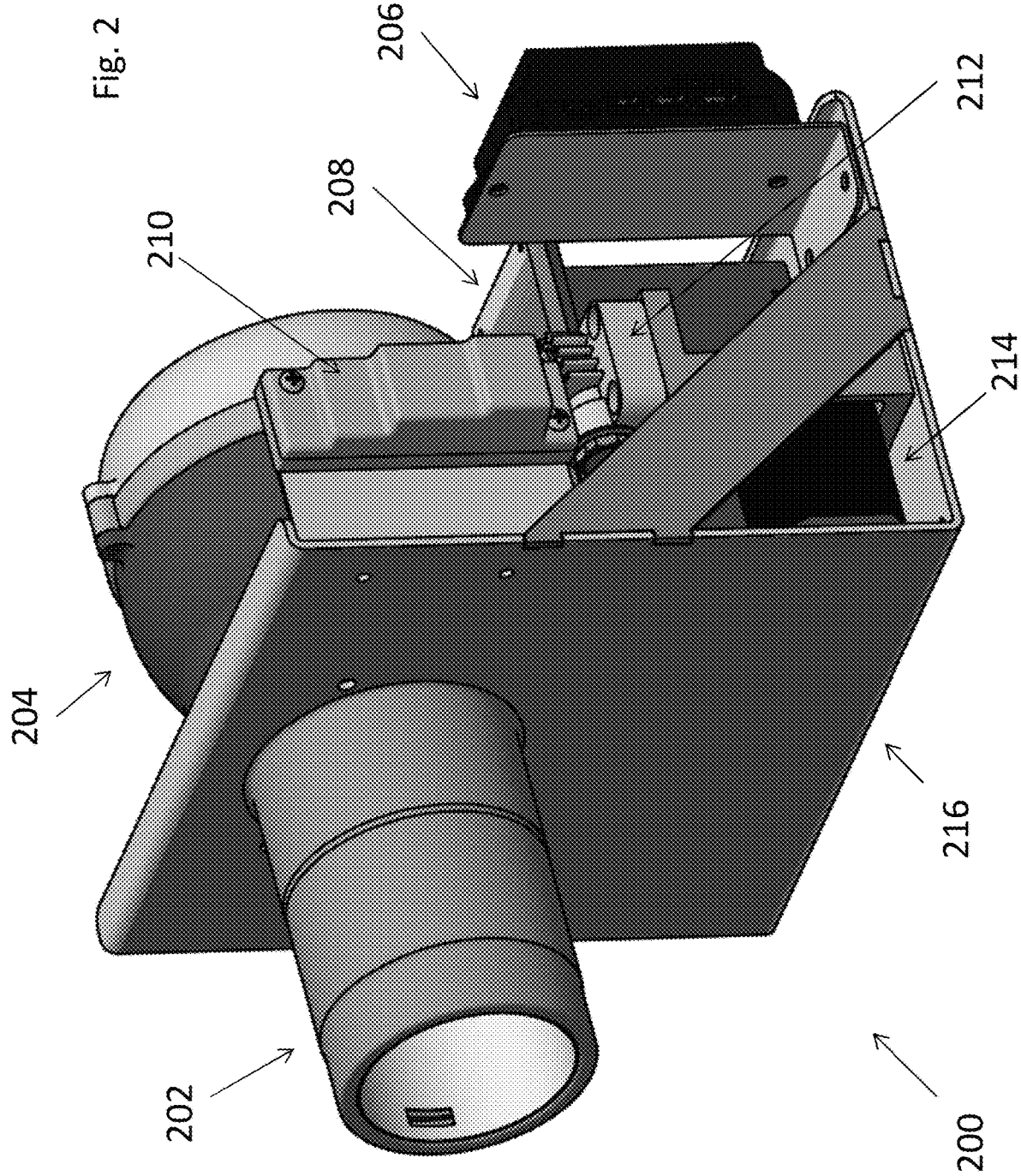
FIG. 2 shows an embodiment of the invention inside of a burner.
Figure 3:
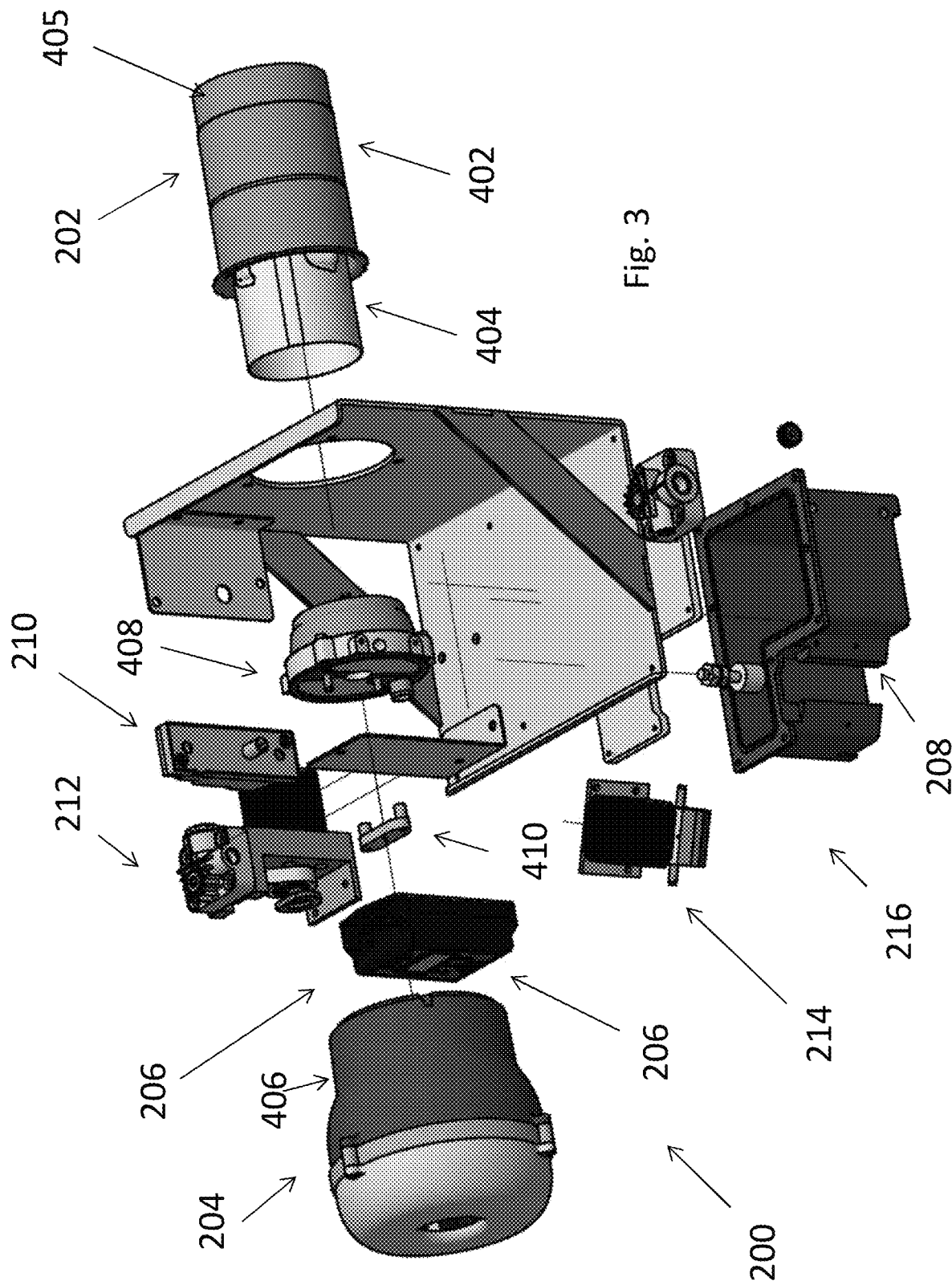
FIG. 3 is an exploded view of the embodiment of FIG. 2.
Figure 4:
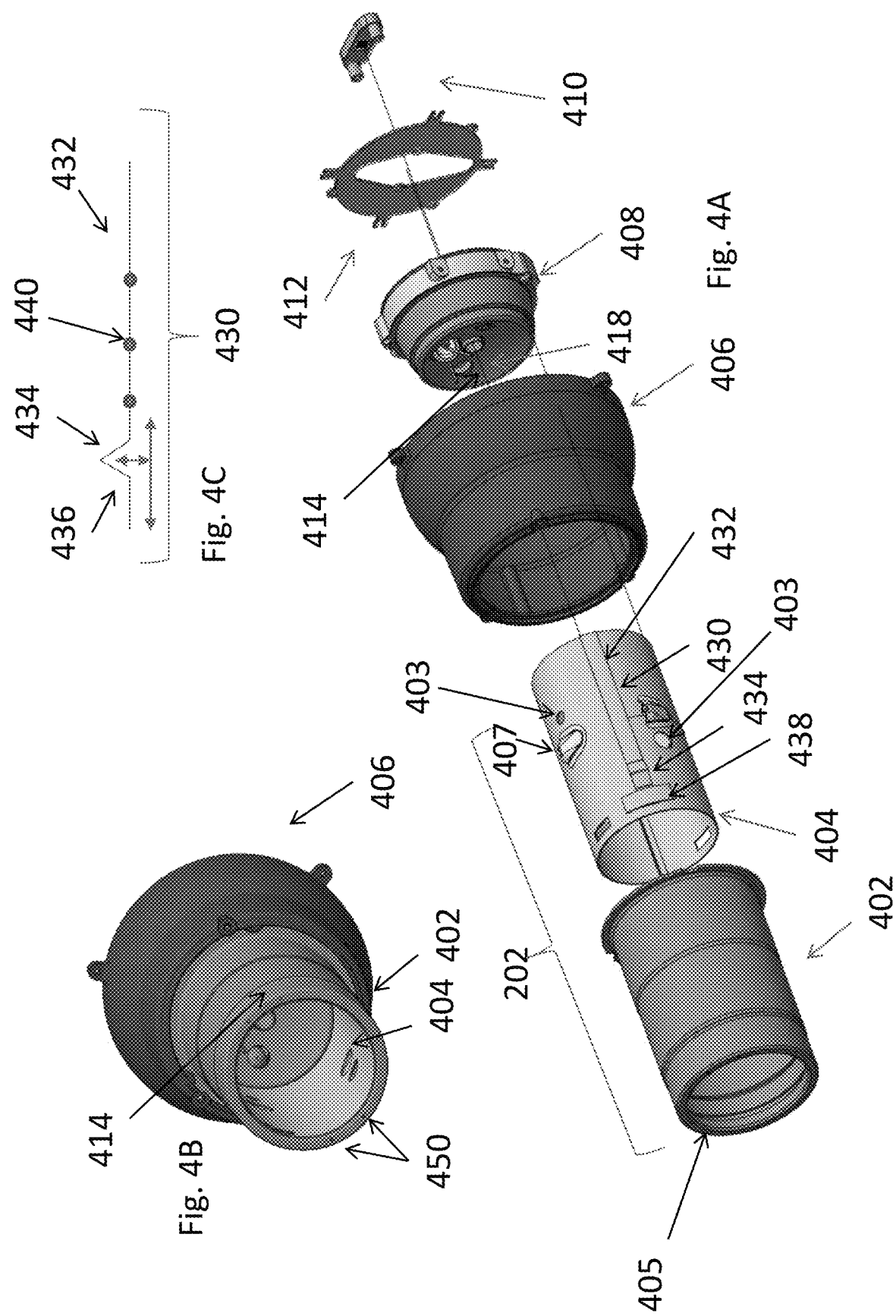
FIG. 4 shows the atomizing chamber and flame tube of FIG. 2.

Referring now to FIGS. 2 and 3, and non-limiting example of an embodiment of a burner 200 consistent with the concept of FIG. 1 is shown. Burner 200 includes a tube assembly 202, a blower 204, a controller 206, a fuel reservoir 208, an ignition transformer 210, an atomizing air pump 212, and a fuel pump 214. The various components are supported by a housing 216. Components are connected and mounted in manners known in the burner art and not further discussed herein.

Referring now to FIGS. 3 and 4A-C, the combustion chamber components of burner 200 are described in more detail. A tube assembly 202 includes an outer air tube 402, an inner flame tube 404, and an end cap 405. Blower 204 blows combustion air through a center hole in atomizing chamber 418 and into the gap between inner flame tube 404 and outer air tube 402. Various holes 403 on both the front and rear ends of inner flame tube 404 allow air to enter for combustion. Various air louvers 407 are provided in inner flame tube 404 to laterally inject air in order to create a swirling motion; in combination with air from holes 403 a swirling combustion process occurs inside inner flame tube 404.

Inner flame tube 404 is formed by a piece of sheet metal with the various holes 403 punched therein. The sheet metal is rolled into a cylinder shape, and the opposing ends are connected by a piece of strip metal 430 laid along the seam. Strip metal 430 includes a rear flat section 432, a bent section 434, and a forward flat section 436. Rear flat section 432 is welded to both sides of the rolled sheet metal by welds 440 to hold the cylinder shape of inner flame tube 404. Bent section 434 is in the shape of an inverted V, although other shapes may be used. Forward flat section 436 extends towards near the end of inner flame tube 404 and acts as stop for end cap 405. Forward flat section 436 is secured to inner flame tube 404 by a strip of metal 438 that extends along the circumference of inner flame tube 404 over forward flat section 436 and is welded at both ends to inner flame tube 404; forward flat section can slide under metal 438 in response to changes in the shape of the bent section 434.

Strip metal 430 is specific to securing the ends of the sheet metal to form the inner flame tube 404. However, other strip metal 430 may be provided around the periphery of inner flame tube 404 for purposes of symmetry so inner flame tube 404 experiences uniform thermal expansion and contraction due to the presence and absence of heat, respectively. Two strip metals 430, one at the seam formed by the rolled sheet metal and one on the opposite side of the inner flame tube are preferred, but any number may be provided.

Perforated air pathways 450 may be provided on the end cap 405 adjacent to each strip metal 430. Escaping blower air will specifically cool excess heat in each strip metal 430. In the alternative, multiple openings in end cap 405 may permit passage of combustion air to cool flame tube assembly 202 and/or to shape combusting flame as it emerges from the air tube flame tube assembly.

The mechanics of the role of the combustion air and non-limiting examples of hole/louver placement are found in U.S. Pat. No. 8,622,737 entitled PERFORATED FLAME TUBE FOR A LIQUID FUEL BURNER, the contents of which is incorporated by reference in its entirety. However, the invention is not so limited, and any number or displacement of holes could be used to introduce air in the inner flame tube 404.

An atomizing chamber 408 is rearward of the inner flame tube 404, and receives fuel from fuel reservoir 208 (pathway not shown). A mounting ring 412 is mounted on the rear of atomizing chamber 408. A support 410 is mounted in rearward of mounting ring 412, and supports a photodiode 504 (FIG. 5). Atomizing chamber 408 includes a hole 414 substantially at the center thereof, through which light from within the inner flame tube 404 can reach photodiode 504. Atomizing heads are rearward of lateral holes 418. A front casing 406 (which is part of the blower 204) has a flange that engages with the rear of outer air tube 402. However, the invention is not so limited, and other forms of atomizing chambers and/or mounting to the diode may be used.

Referring now to FIG. 5, the support 410 is shown in more detail. Support 410 supports a circuit board 502, which in turn supports photodiode 504. Photodiode 504 is part of a flame detection device described in more detail in U.S. Provisional Patent Application 62/274,879 discussed above. However, the invention is not so limited, and other forms and/or locations of flame detection could be used.

Figure 6:
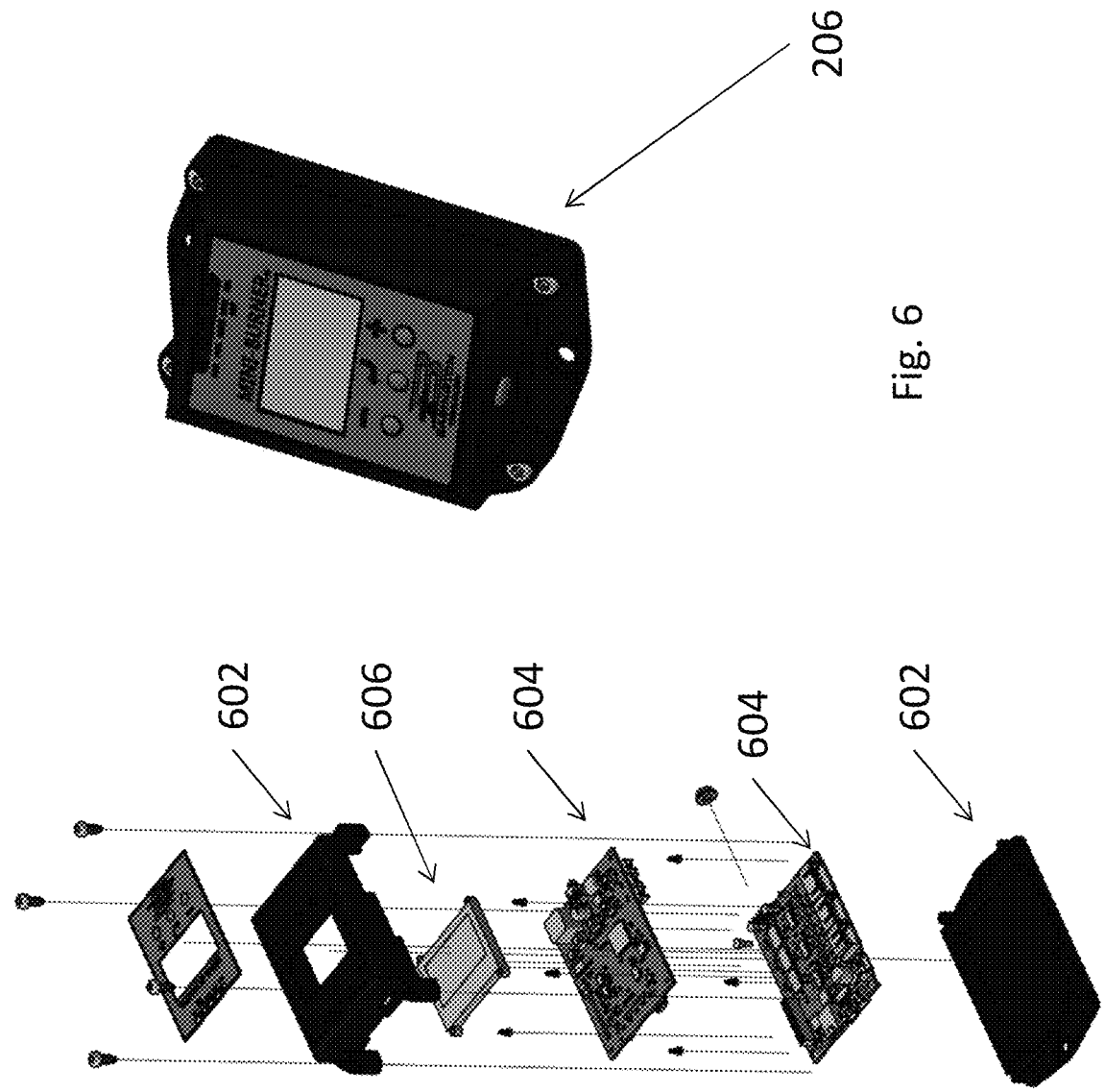
FIG. 6 shows the controller of FIG. 2.

Referring now to FIG. 6, controller 206 is shown in more detail. From hardware perspective, controller 206 includes housing components 602, circuit board components 604, and display 606. The circuit board components includes standard computer components such as at least one interface, display, processor, memory, wireless modem, jack for wired modem, etc. as is well known in the art and not discussed further herein. Controller 206 also includes software and/or stored data to control the operation of burner 200 as discussed further herein. Software may be periodically updated to allow for new control protocols. The invention is not limited to the particulars of the implementation of controller 206, and the functionality therein may be in one unit as shown, multiple units, and/or work in cooperation with an external computer.

Figure 7:
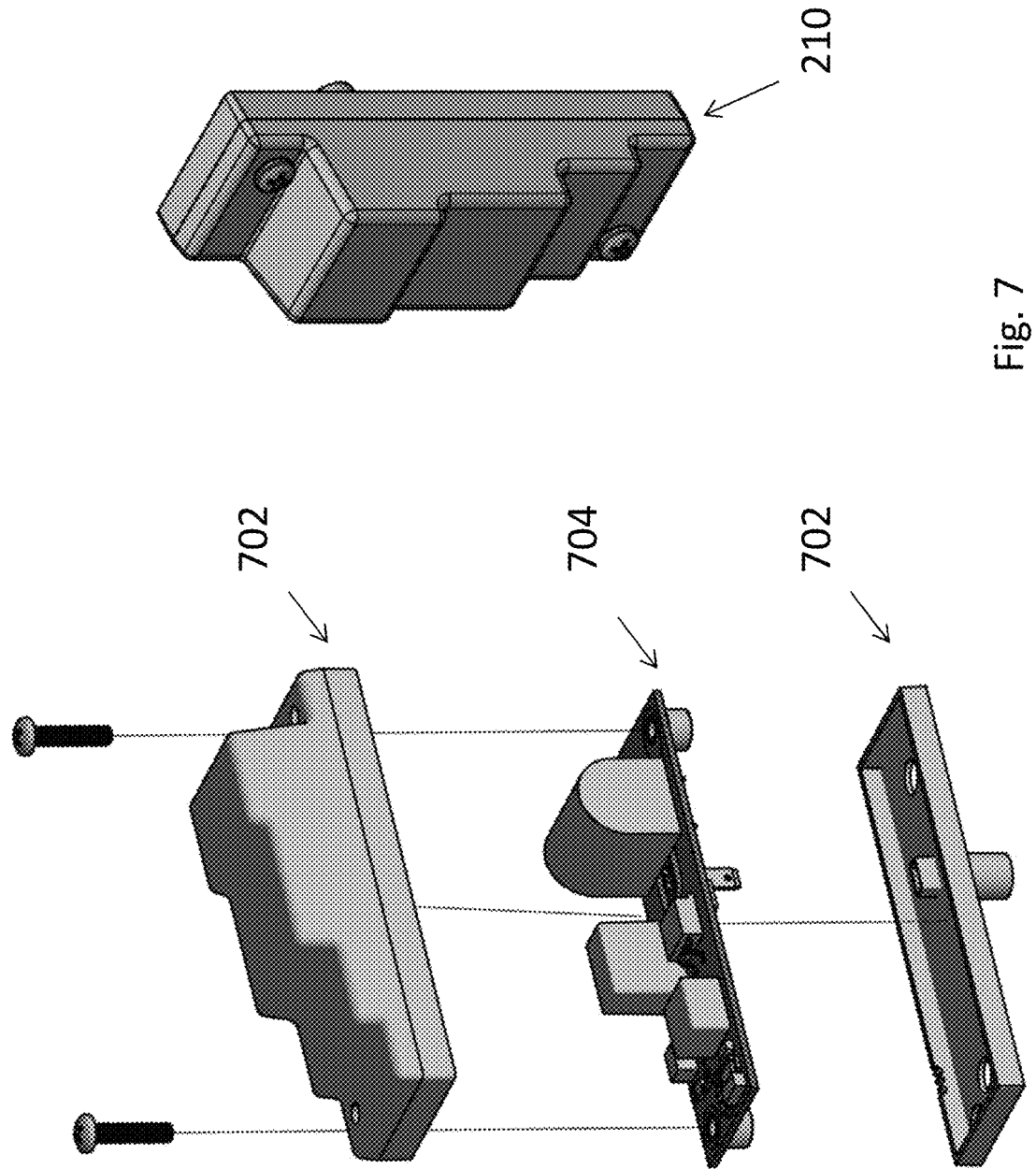
FIG. 7 shows the ignitor transformer of FIG. 2.

Referring now to FIG. 7, ignition transformer 210 is shown in more detail. Ignition transformer 210 includes housing components 702 and a printed circuit board 704. As is known in the burner art, ignition transformer 210 converts available external power (AC or DC, not shown) into the power to generate a spark that it provides to electrodes (not shown) in atomizing chamber 408. However, the invention is not so limited, and other forms of ignitors may be used.

Referring now to FIG. 8, atomizing air pump 212 is shown in more detail. Atomizing air pump 212 includes a DC motor 802 below a frame 804, a bearing 806, a piston 808, a piston bushing 810, a counterweight 812, an O-ring 814, a piston ring 816, and a compressor cylinder head 818. However, the invention is not so limited, and other forms of atomizing air pumps may be used. DC motor 802 drives piston 808 to provide clean air to the holes in atomizing heads to spray fuel.

Figure 9:
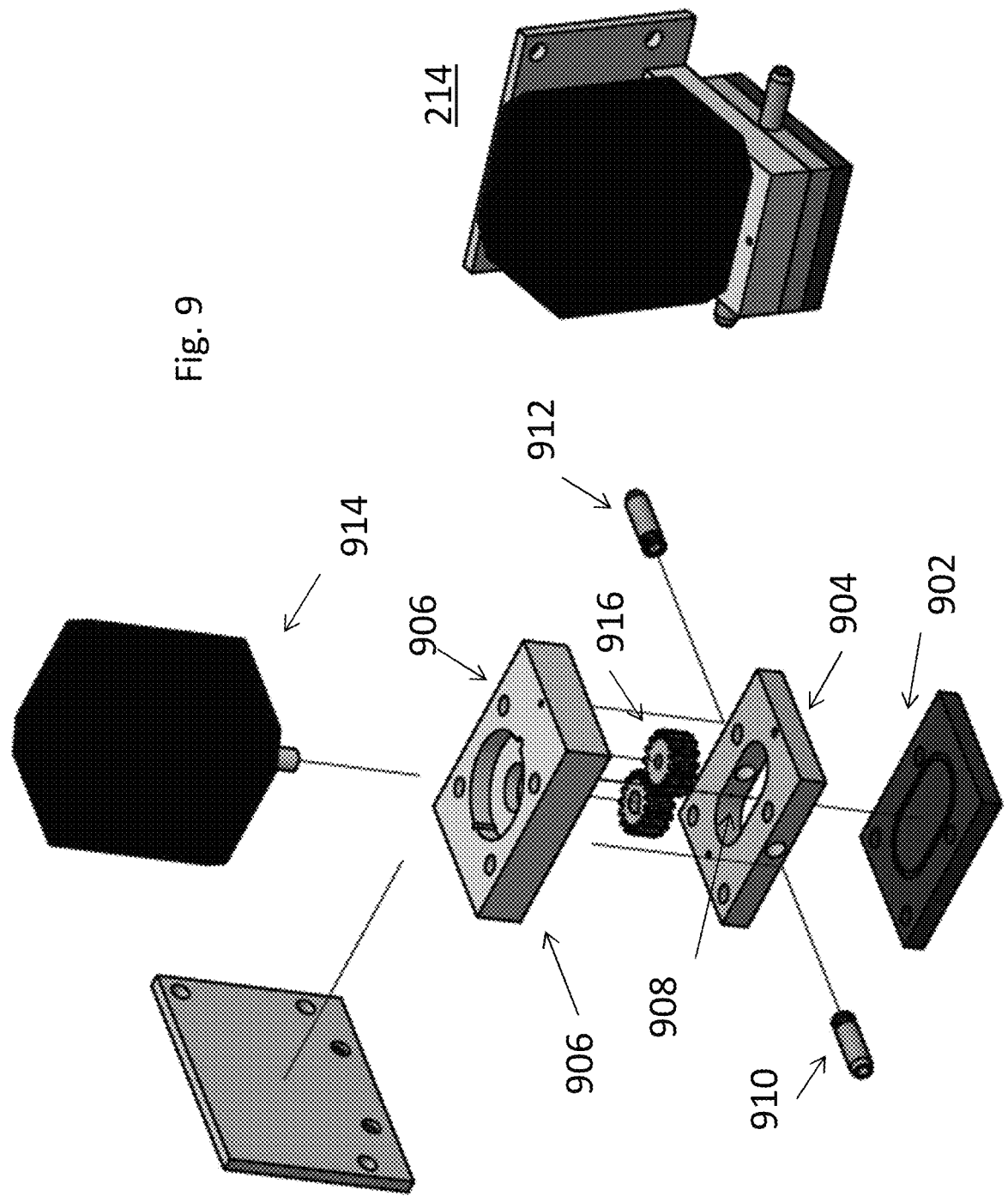
FIG. 9 shows the fuel metered pump of FIG. 2.

Referring now to FIG. 9, fuel pump 214 is shown in more detail. A bottom base plate 902, a support plate 904 and a top plate 906 define an inner chamber 908 with fluid inlet and outlet pathways 910 and 912. A DC motor 914 drives gears 916 within inner chamber 908 to draw fluid from fuel reservoir 208 to atomizing chamber 408. However, the invention is not so limited, and other forms of fuel pumps may be used.

Figure 10:
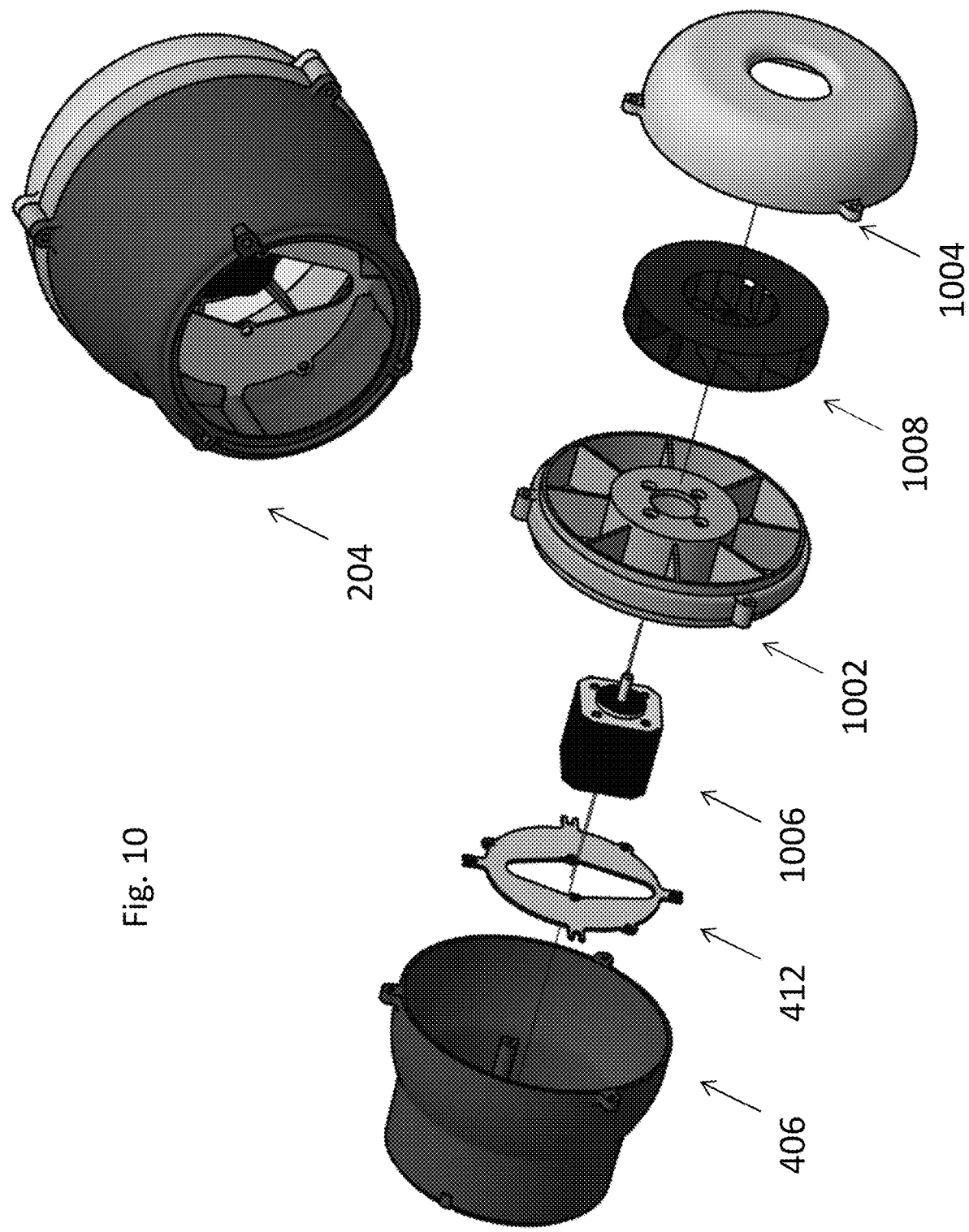
FIG. 10 shows the blower of FIG. 2.
Figure 11:
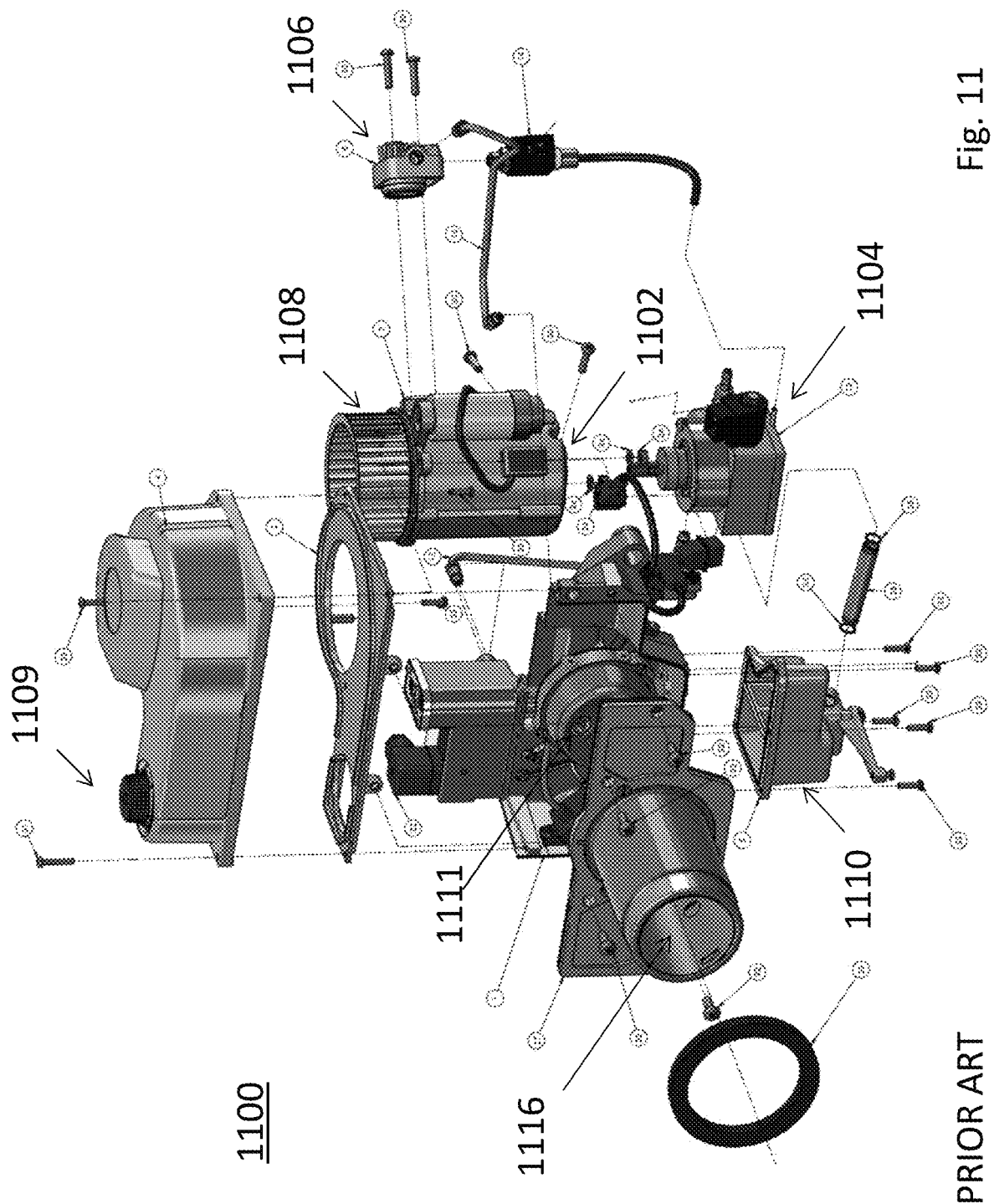
FIG. 11 shows a prior art burner.

Referring now to FIG. 10, blower 204 is shown in more detail. The outer shell is defined by front casing 406, and intermediate support 1002, and rear casing 1004. A DC motor 1006 drives a blower wheel 1008 to draw air through an opening in rear casing 1004 and blows it out front casing 406 into the space between inner and outer tubes 402 and 404 as discussed above. Intermediate support provides a mounting point for both motor 1006 and blower wheel 1008.

Referring now to FIGS. 12A-E, atomizing chamber 408 is shown in more detail. A front cover 1202 has hole 414 for blower air and light to pass through the atomizing chamber, holes 418 for passing atomizing fuel, and a hole 1230 to accommodate ignitor 1216. Ignitor 1216 via ignition transformer 210 ignites the atomized fuel that combusts inside the combustion chamber.

A back plate 1204 to which front cover 1202 attaches (via screws or the like) has fuel holes 1209 that provides fuel from fuel pump 214 (pathway 122 in FIG. 1), atomizing air holes 1208 that provides atomizing air from atomizing air pump 212 to atomizing heads 1206 (pathway 104 in FIG. 1), and a fuel return hole 1220 through which excess fuel returns to the fuel reservoir 208 (pathway 130 in FIG. 1). Caps 1210 cover the atomizing heads 1206, and have holes 1212 above to receive fuel feed tube lines 1214. Fuel lines 1214 connect fuel holes 1209 to the holes 1212 to deliver fuel over atomizing heads 1206.

Holes (not shown) in the bottom of caps 1210 direct excess fuel into a fuel collection area 1240 defined by a half clam shell 1218 welded to back plate 1204. Clam shell 1218 has a top portion that follows the contours of the components above it, and a lip that rests on back plate 1204. The front of clam shell 1218 is separated from front cover 1202 by an air gap 1238. In this configuration clam shell 1218 and back plate 1204 collectively define fuel collection area 1240 in which the pool of overflow fuel collects and is diverted to fuel return hole 1220.

The above embodiment combusts fuel in a manner consistent with the Babington atomization principle. Fuel pump 214 delivers fuel over the atomizing heads 1206. Atomizing air pump 212 pumps air through holes in the atomizing heads, spraying the delivered fuel into the inner flame tube 404. Blower 204 delivers combustion air into the inner flame tube 404 to facilitate combustion of the fuel. Ignitor 1216 ignites the fuel spray to induce combustion.

Figure 13:
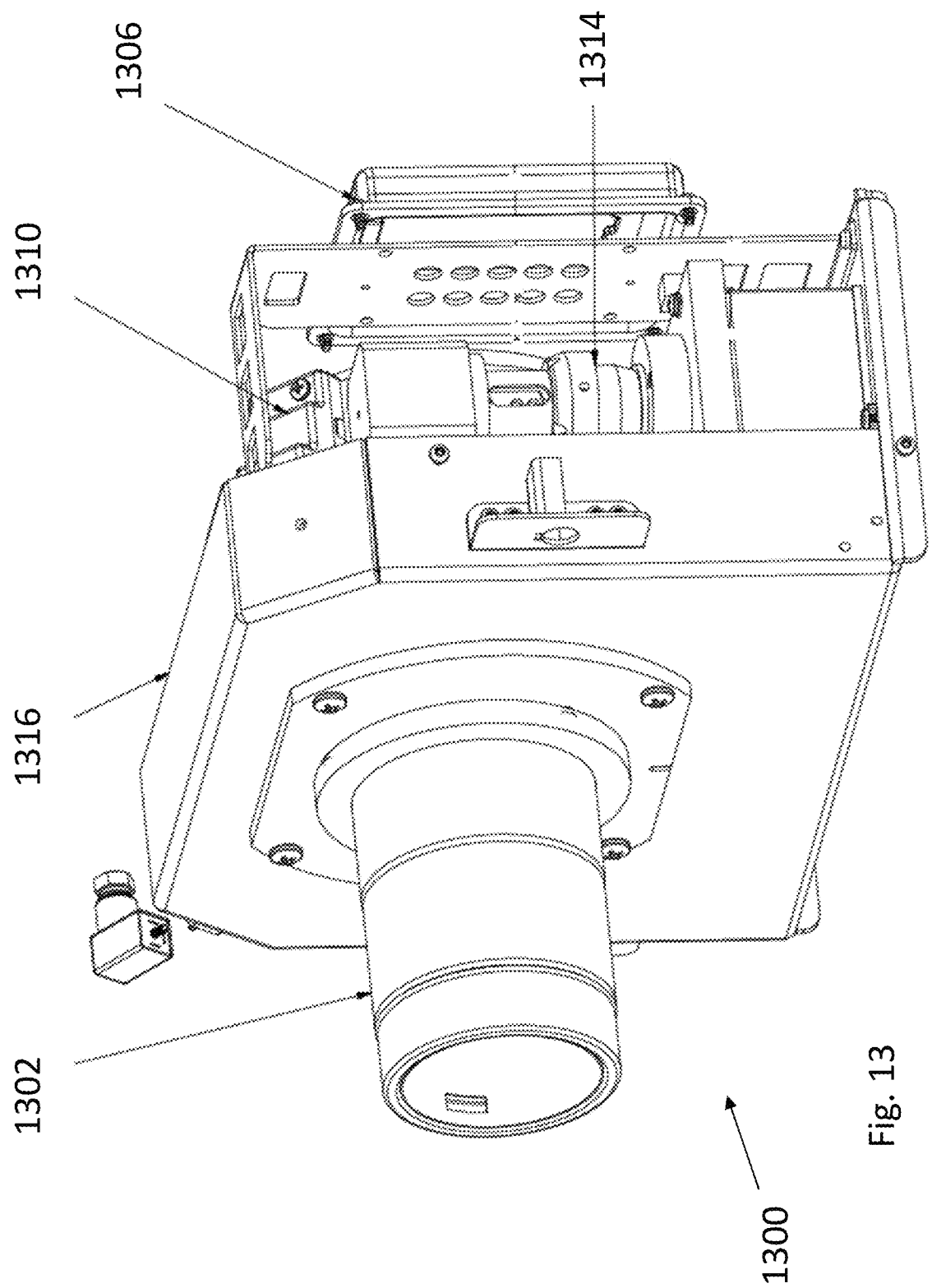
FIG. 13 shows another embodiment of the invention.
Figure 14:
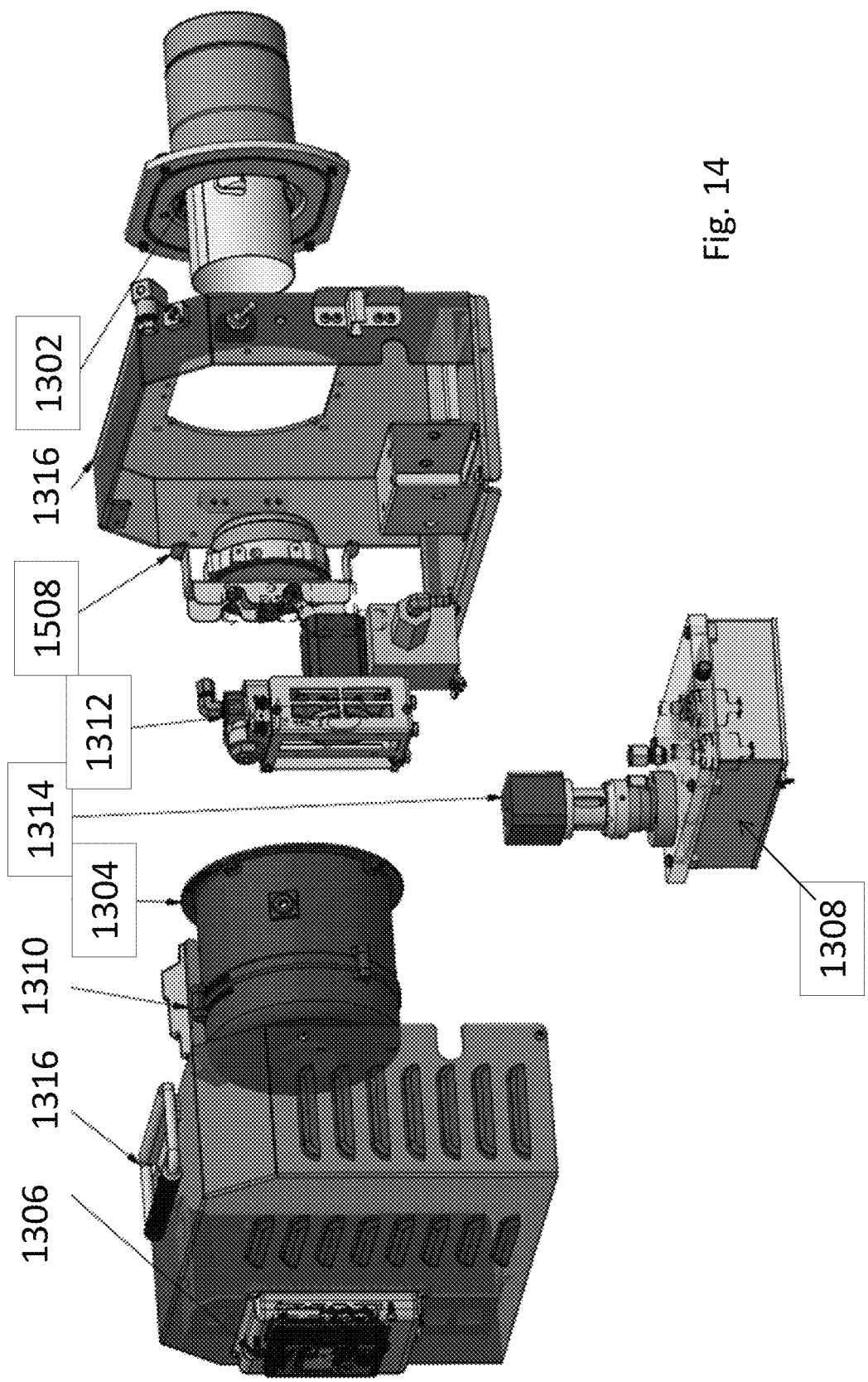
FIG. 14 is an exploded view of the embodiment of FIG. 13.

Referring now to FIGS. 13 and 14, and non-limiting example of another embodiment of a burner 1300 consistent with the concept of FIG. 1 is shown. Burner 1300 includes a tube assembly 1302, a blower 1304, a controller 1306, a fuel reservoir 1308, an ignition transformer 1310, an atomizing air compressor pump 1312, and a fuel metered pump 1314. The various components are supported by a two halves of a housing 1316. Components are connected and mounted in manners known in the burner art and not further discussed herein.

Figure 15:
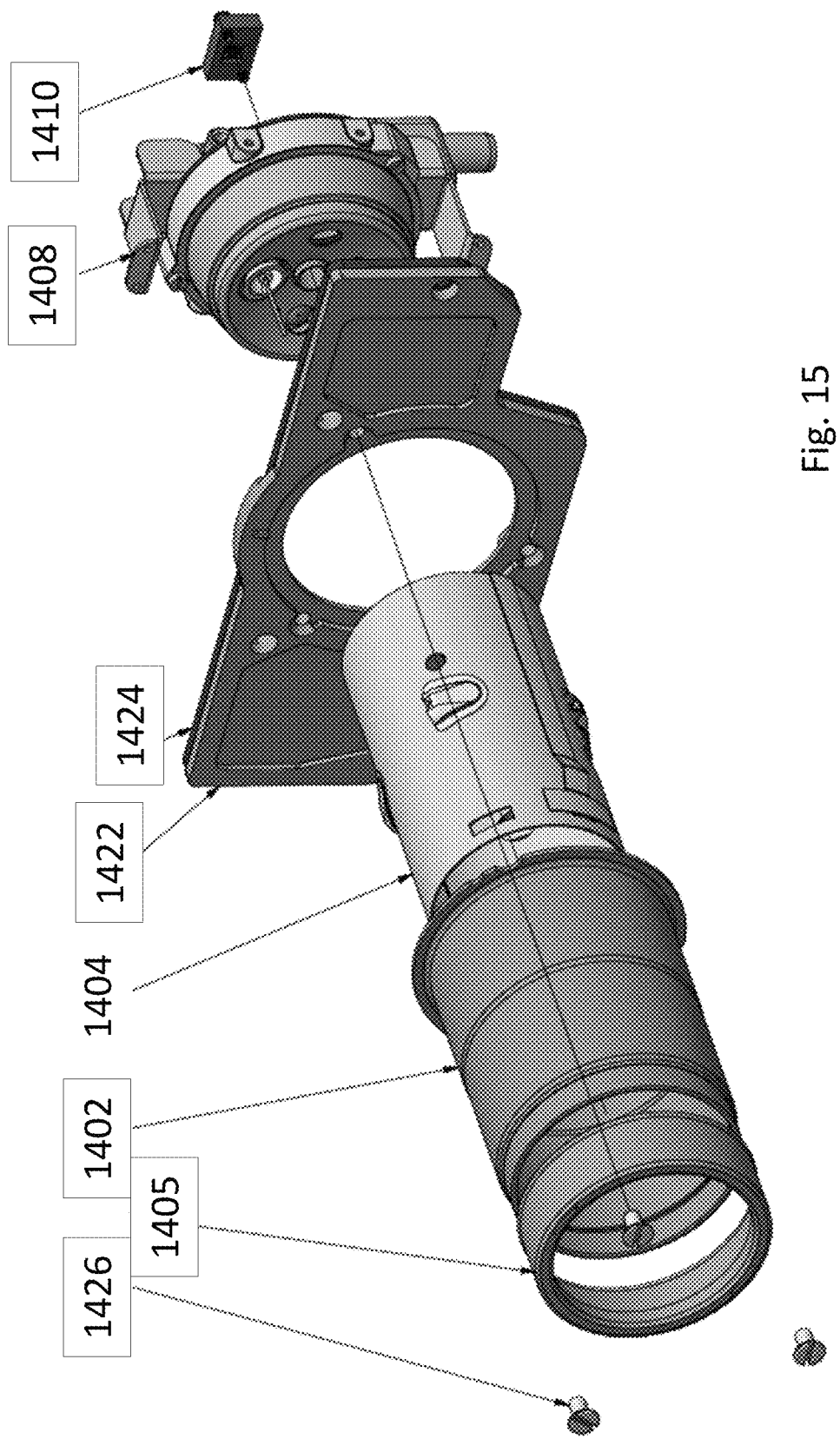
FIG. 15 shows the atomizing chamber and flame tube of FIG. 13.

Referring now to FIGS. 14 and 15, the combustion chamber components of burner 1300 are described in more detail. Tube assembly 1302 includes an outer air tube 1402, an inner flame tube 1404, and an end cap 1405 welded onto outer air tube 1402. An atomizing chamber 1408 is rearward of the inner flame tube 1404, and receives fuel from fuel reservoir 1308 (pathway not shown). A photodiode 1410 is mounted behind atomizing chamber 1408 and receives light from combustion. A mounting flange 1422 with a gasket 1424 may be provided to secure outer air tube 1402 to housing 1316 via screws 1426.

The structure and operation of the components of burner 1300 is consistent with burner 200, and not repeated here.

Various features of the embodiments herein render it more suitable for burning of biodiesel than certain commercial grade embodiments of U.S. Ser. No. 15/405,685.

As discussed above, certain commercial grade embodiments of U.S. Ser. No. 15/405,685 when burning biodiesel over time accumulated partially oxidized hydrocarbons as sludge inside its atomizing chamber. Applicants believe this is due to the absence in the commercial designs of holes in the rear portion of the inner flame tube, such that commercial designs only introduced combustion air into the forward portion of its inner flame tube but not into the rear portion. As a result combustion would occur in the front portion of the inner flame tube resulting in metal temperature of 1100°, while the rear portion of inner flame tube as adjacent the atomizing chamber was at a (relatively) cooler metal temperature of 500°. While this configuration was effective for diesel, when burning biodiesel at the lower flame temperature near the atomizing chamber only partially oxides some of the atomized fuel, thereby leading to the accumulation of partially oxidized hydrocarbons in the atomizing chamber as sludge.

In the embodiments disclosed herein, the presence of holes 403 in the rear portion of inner flame tube 404 induces combustion physically closer to atomizing chamber 408 than prior art burners. The operating temperature adjacent to atomizing chamber 408 is thus significantly higher, and in particular high enough to more completely oxide the atomizing fuel. The presence of holes 403 results in a hotter flame near the atomizing chamber, resulting in flame tube metal temperatures of 1000°. This minimizes the creation and accumulation of partially oxidized hydrocarbons.

Prior art inner flame tubes are assembled similar to inner flame tube 404 in that a piece of sheet metal is rolled and secured into place by a piece of strip metal; the strip metal is welded entirely to such inner flame tube. As is known in the art, an inner flame tube will expand and lengthen when heated due to thermal expansion. The connecting strip metal would also lengthen and expand, albeit to a different extent due to the different overall shapes. With only partial combustion in the flame tube the difference in amount of expansion places stress on the weld connection between the strip metal and the inner flame tube, but not enough to damage (within expected lifecycle) the prior art burner due to the absence of combustion in the rear portion of the inner flame tube.

Inner flame tube 404 may similarly be made with a strip metal welded along its length. However, since inner flame tube 404 initiates combustion in the rear portion, there is more heat to contend with and thus more expansion in length than the prior art. Over time, this additional expansion places greater stress on the connection and could crack at a rate that could require frequent repair or replacement. Strip metal 430 as used herein is thus fixedly secured to inner flame tube 404 (preferably via spot welding) at the rear flat section 432, while the bent section 434 and loosely attached forward flat section 436 act as a thermal spring that can freely expand and contract without placing any stress on the connection to the inner flame tube 404. The arrangement could also be reversed with rear flat section 432 loosely secured while front flat section 436 is fixedly secured.

As discussed above, in an atomizing burner the amount of fuel delivered to atomizing heads 1206 may exceed the amount that is actually ignited by the burner, and excess fuel falls by gravity along a return pathway which directs the excess fuel back into fuel tank. As a matter of practice due to fluid mechanics, in the prior art the return path forms a small pool of returning fuel at the bottom of the atomizing chamber adjacent the front cover that faces the combustion in the inner flame tube. In the prior art this was not a concern because due to the lack of combustion in the rear of the inner flame tube, as the corresponding 500° temperature in the atomizing chamber would not ignite or chemically effect that pool of fuel.

In the embodiments herein, the initiation of combustion in the rear portion of the inner flame tube 404 induces an increase in temperature in the atomizing chamber 408. To avoid any undue influence of that temperature increase on the pooling fuel, the presence of clamshell 1218 causes the pool to form in fuel collection area 1240 and away from front cover 1202. The air gap 1238 between front cover 1202 and clamshell 1218 acts as an insulator, and clamshell 1218 acts as a heat shield. The air gap insulation and the heat shield collectively protect the pool of fuel from the temperature of combustion within the rear portion of the inner fame tube 1404; some heat will get through to the pooling fuel, but not enough to present an operational concern.

Figure 16:
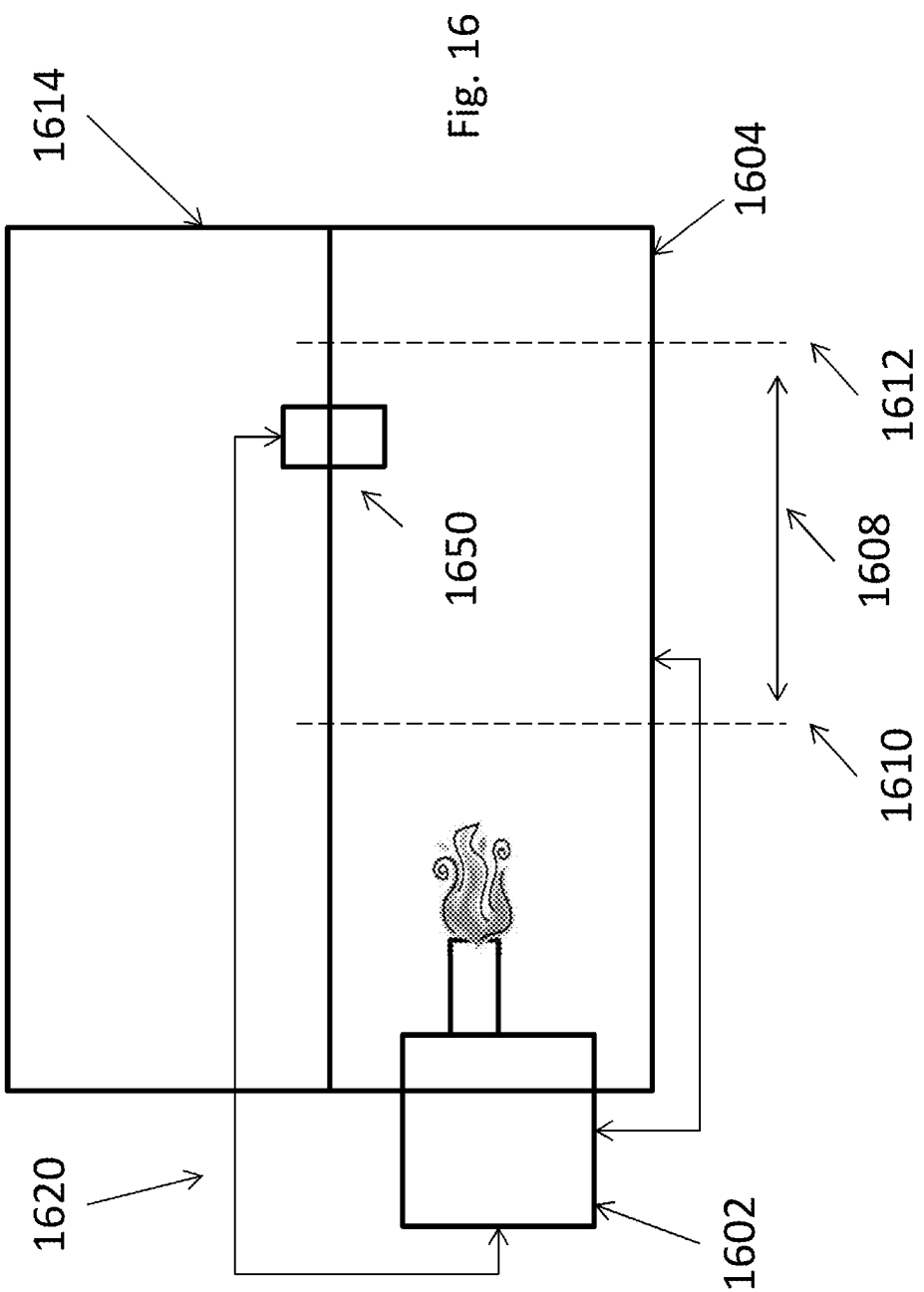
FIG. 16 shows an embodiment of an appliance with a burner incorporated therein.

Referring now to FIG. 16, an example is shown in which a burner 1602 (e.g., burner 100, 200, 1300, a burner per U.S. Ser. No. 15/405,685, or other burner) is connected to a heat exchanger 1604 of an appliance 1614 that receives the heat of combustion, such as an oven or griddle. Oxygen sensor 1650 penetrates heat exchanger 1604 such that a forward sensing portion can determine the amount of oxygen in the heat exchanger 1604, while a rear portion has a data pathway 1620 that connects back to the burner controller (e.g., 206, 1306) through known connection methodologies. Oxygen sensor 1650 may be an off the shelf component that is designed to withstand high temperature environments, such as BOSCH LSU4.9, although the invention is not limited to any specific type of oxygen sensor. Also, the invention is not limited to placing the oxygen sensor in the heat exchanger, and other locations can be used such as the exhaust flue. In the alternative, the oxygen sensor could be mounted in the burner itself.

The appliance 1614 may also provide data, commands or otherwise communicate with burner 100 over data pathway 1620. Oxygen sensor 1650 may also be integrated into the appliance 1614 itself, such that only one data pathway is used for the communications. The invention is not limited to how burner 100, oxygen sensor 150 and/or the appliance exchange information or commands.

Oxygen sensor 1650 can periodically sample (e.g., once every ten seconds, although the invention is not limited to any regular or irregular period) the oxygen content in the burner output within heat exchanger 1604. Oxygen content is proportional to the amount of air (uncombusted air is 20.9% oxygen), and thus the amount of oxygen detected is indicative of the amount of excess air.

As is known in the art, oxygen sensors that operate at high temperatures must be electrically heated to a specific operating temperature, and requires significant power to operate. By way of non-limiting example, the BOSCH LSU4.9 sensor must be electrically heated to about 780° C. and requires some 20 Watts of power to do so. The burners consistent with the embodiments herein described herein can operate at about 50 Watts which is ideal for low power environments, yet in conjunction with the additional power for the oxygen sensor could be over 70 Watts.

Embodiments herein can reduce the overall power needed to operate oxygen sensor 1650. One such embodiment is based on control, in that the oxygen sensor 1650 is only activated periodically to take occasional readings rather than operate continuously. Such occasional use leverages the fact that conditions in a heat exchanger 1604 change slowly. By way of non-limiting example, if oven temperature is changed from 200° to 500°, it can take 5-15 minutes for the oven to reach the new temperature. Similarly, it can take 20-60 seconds for the amount of excess air produced by burner 1602 to meaningfully change. Thus the oxygen sensor 1650 need only need be periodically activated rather than continuously monitoring the environment. The periodic activation may be irregular or at regular intervals. A frequency for regular intervals of once per minute may be used, preferably twice a minute, although the invention is not limited to any regular or irregular frequency.

An embodiment of architectural based power reduction is placement of oxygen sensor 1650 within heat exchanger 1604, and particularly the distance from the front of burner 1602. The heat profile of the burner in the heat exchanger is based on distance from the heat exchanger, where the temperature is hottest at the immediate front of the burner 1602 and the temperature is lowest at the furthest point away in the heat exchanger 1604. By way of example in an oven using an embodiment herein the highest temperature at the output of the burner 1602 is about 3000° and the lowest temperature at the far end is 1000°. These temperatures and the temperatures at points there between can be determined for any particular burner/heat exchanger combination using standard computational fluid dynamics modeling techniques as is known in the art.

Oxygen sensor 1650 may be placed within an operating zone 1608 defined by a minimum distance 1610 and a maximum distance 1612 from the front of burner 1602. Minimum distance 1610 is the minimum distance that ensures that the oxygen sensor 1650 would not be destroyed or damaged by the maximum burner output during a normal commercial lifetime of burner 1602 and/or sensor 1650. Minimum distance 1610 is thus environment specific based on the combination of the nature of the burner 1602 and heat exchanger 1604, and can be easily determined by one of skill in the art by using, e.g., computational fluid dynamics modeling techniques as is known in the art.

As noted above, oxygen sensor 1650 must be heated to a considerable temperature (e.g., 780° C.) to operate, and requires considerable amounts of electrical power to do so. However, in heat exchanger 1604, some heat is already provided by burner 1602, and thus oxygen sensor 1650 is preheated and requires less power to reach its operating temperature. By way of non-limiting example, it may take 20 watts to electrically heat oxygen sensor 1650 to 780° C. from room temperature, yet only take 5 watts to reach 780° C. if the oxygen sensor 1650 is pre-heated to 500° F. due to the heat in the heat exchanger 1604. Maximum distance 1612 is thus the distance at which the oxygen sensor can be meaningfully heated by the output of burner, in that heat from the burner can be used as supplemental heat source to heat the oxygen sensor 1650 to its operating temperature. The maximum distance 1612 is thus the distance that allows the oxygen sensor 1650 to only require at most 80% of the electrical energy needed to reach the operating temperature, preferably at most 70%, and particularly at most 60%.

System Control

For frame of reference embodiments of system control will be discussed with respect to the embodiment of burner 100, although it is to be understood the invention is not so limited.

Controller 112 is connected to the three DC flow motors 110, 124, and 136. As DC motors, their speed is adjustable to adjust the flow rates of fuel, atomizing air and combustion air. Controller 112 can thus control the speeds of the three flow parameters that define how much heat output burner 100 produces, such as by controlling the amount of voltage applied or rate of pulsing of the motors. However, the invention is not limited to the manner in which the controller 112 determines the flow parameters and controls the speed of the DC motors.

As noted above, in an atomization burner the flow of compressed air, combustion air and fuel must maintain a certain relationship in order to properly combust the fuel. Controller 112 is accordingly programmed with protocols to set those three flow parameters to meet the desired goal of the system, which may be a target operating temperature of an appliance (e.g., 300, 350, 400° and gradations there between) or certain heat output (e.g., 1%, 2% . . . 99%, 100% and gradations there between, or 50,000 BTU/hr, 75,000 BTU/hr, 100,000 BTU/hr). Preferably this is done algorithmically and/or through a database of parameters to meet the specific needs of the environment, such as the type of appliance, type of fuel, external temperature, presence of rain, target excess air, etc. For example, the amount of heat needed to heat a stockpot cooker is different than to heat an oven, the latter being larger and traditionally operating at higher temperatures. Controller could thus maintain one set of operating protocols for an oven, another for a stockpot cooker, etc. Each set of appliance specific protocols in turn would have specific combinations for the other parameters as discussed above. Given the various possible combinations (e.g., the range of devices, temperature, excess air), there may be thousands of different stored protocols for the various combinations.

Some non-limiting examples of combinations are as follows (speeds in revolutions per minute ("RPM")):

| Appliance | Heat output | Excess air % | Blower speed (motor 136) | Fuel speed (motor 124) | Atomizing air speed (motor 110) |
|---|---|---|---|---|---|
| Oven | 7% | 30% | 1250 | 300 | 2500 |
| Oven | 55% | 30% | 2500 | 600 | 3500 |
| Oven | 100% | 30% | 5000 | 900 | 3500 |
| Oven | 7% | 45% | 1500 | 300 | 2500 |
| Oven | 55% | 45% | 3000 | 600 | 3500 |
| Oven | 100% | 45% | 6000 | 900 | 3500 |

As seen in the above example, at least some of the stored combinations are preferably specific to a particular excess air value. By way of example, burner 100 may store burner parameters for biodiesel fuel consistent with 30% excess air, and an entirely different set of burner parameters for biodiesel fuel consistent with 45% excess air (possibly as the default set of burner parameters). The default set of burner parameters with the higher excess air values may provide both a starting point for operation, as well as a fallback to be used in the absence of data from oxygen sensor 150 (either because it is not functioning, or simply was not included in the design).

Figure 17:
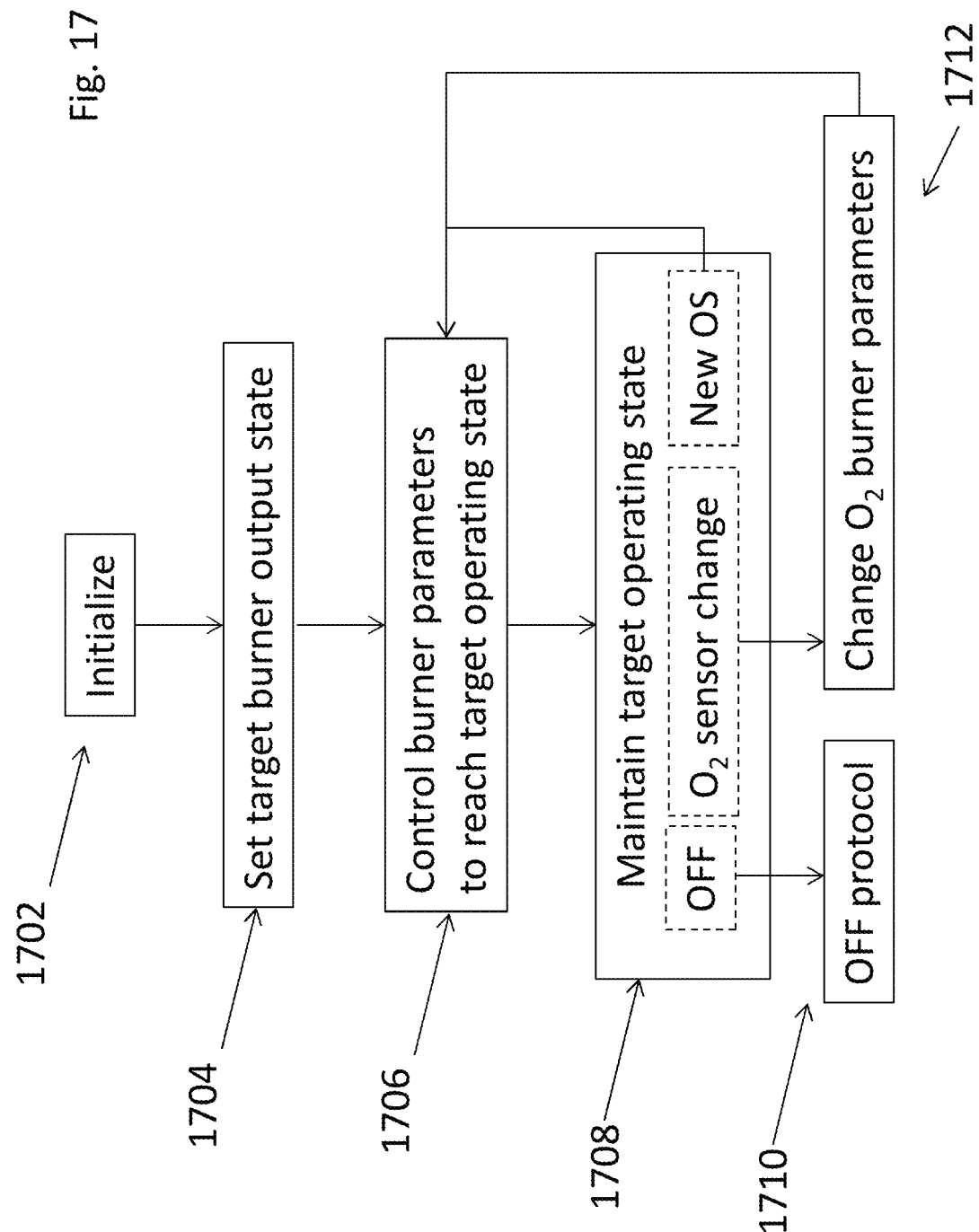
FIG. 17 shows an embodiment of a process for controlling a burner.

Referring now to FIG. 17, an embodiment is shown for a process to activate and use a burner with an oxygen sensor as set forth herein. For ease of reference discussion of the burner components is discussed with respect to burner 100 FIG. 1.

If the burner is in an OFF state, then in response to an ON command at block 1702 the controller 112 initializes burner 100 for use via an OFF-to-ON protocol. A non-limiting example of such a protocol is disclosed in U.S. Ser. No. 15/405,685 as incorporated herein, although the invention is not limited to such a protocol.

Also block 1702 can be incorporated into block 1706, or occur after step 1704 as discussed below.

Once initialized, at block 1704 controller 112 receives the desired operating state, preferably by user input to controller 112 or from memory, although the invention is not limited to how the desired operating state is received or determined. By way of non-limiting example, the desired operating state could be device=oven, temperature=350, fuel=B20 biodiesel, excess air=35%, etc. The parameter of device could be omitted if the burner is dedicated to a particular type of appliance such that settings for other devices would not be needed.

At block 1706 controller 112 will implement a protocol to control the burner parameters (e.g. at least some of the three motor speeds) to drive burner 100 to the desired operating state, as discussed in more detail below. By way of non-limiting example, for an oven currently at room temperature and with an entered target temperature of 350°, controller 112 will control burner 100 for the oven to reach the 350° target, which may take several minutes. As discussed above, if the initialization functionality of block 1702 is incorporated into block 1706, then block 1706 would drive to the target operating state by initializing burner 100 and before commencing the drive toward the target operating state.

Once burner 100 reaches the target or approaches a predetermined range relative to the target, at block 1708 controller 112 will maintain burner in the desired operating state based on current conditions, including excess air output (when available). Specifically, due to the fuel variances, and mechanical variances and environmental variances discussed above, the output of burner 100 will tend to vary from what is dictated by the desired burner parameters. Controller 112 can therefore, in response to environmental conditions such as appliance status (as may be measured by burner 100 or provided by the appliance) regulate the burner parameters to compensate.

By way of non-limiting example, if the appliance informs the burner that the temperature has dropped from target, controller 112 can change the burner parameters (typically the blower speed, although the invention is not so limited) to increase the heat output and raise temperature. By way of another non-limiting example, if the excess air drops below target, controller 112 can change the burner parameters (typically the blower speed, although the invention is not so limited) to increase the amount of excess air. These changes may be single step, multi-step, and/or adaptive as discussed herein.

Control remains in block 1708 unless and until some type of change occurs. Non-limiting examples of changes are turning the burner 100 OFF, changing the input parameters such as a change in the target temperature (e.g., user increases desired temperature from 350° to) 450°, malfunction in sensor 1650, other malfunction, loss of fuel source, loss of primary power, etc. The invention is not limited to the nature of the change that could occur at block 1708.

If the change is to turn the burner OFF, then control passes to block 1710 for an ON-to-OFF protocol. A non-limiting example of such an ON-to-OFF protocol is disclosed in U.S. Ser. No. 15/405,685 as incorporated herein, although the invention is not limited to such a protocol, and such a block may be omitted (i.e., the motors are simply shut down).

If the change is input of a new operating state (e.g., raise the oven temperature), then this is akin to receiving a new target burner output state at block 1704. Control thus passes to block 1706 to drive burner 100 to that new target operating step in the manner discussed herein. Note block 1706 may avoid any changes to the burner parameters if the new target operating state is so close to the old one that no changes are called for.

If the change is a loss of reliable input from the oxygen sensor 150, then as discussed in more detail below at block 1712 controller 112 can change the burner parameters to a set consistent with an excess air amount that is high enough to account for the inability to compensate for the noted variances and thus remain above the turn up area of about 15%. By way of non-limiting example controller 112 could use the default set of burner parameters that may be specifically provided for this circumstance. Control then passes to block 1706 to implement the new burner parameters. regulation/maintenance will continue as appropriate at block 1708; regulation/maintenance may continue without reliance on oxygen sensor 150 until such time as reliable operation of oxygen sensor 150 is restored.

If the change is restoration of reliable input from the oxygen sensor 150, then as discussed in more detail below at block 1712 controller 112 will change the burner parameters consistent with a lower excess air amount. Control then passes to block 1706 to implement the new burner parameters.

It is possible that blocks 1706 and 1708 are the same block, in that controller 112 sets the burner to settings of the desired output state for which burner 100 will settle at. It may also be that the 1708 is a continuation of block 1706, in that a common protocol is applied over both steps and block 1706 represents the earlier application of that protocol and block 1708 represents the later application of that protocol. Blocks 1706 and 1708 may have different protocols, in that the protocol to reach the target operating state may be partially or entirely different from the protocol to maintain that state.

As noted above, at block 1706, controller 112 may determine/recall and implement the protocol that it will use to transition burner 100 from its current operating state to the desired operating state. The invention is not limited to the protocol used.

A non-limiting example of a single step protocol would be for controller 112 to (a) recall from memory the burner parameters (e.g., speed of the three motors 110, 124 and 136) of the target operating state and (b) to operate the burner 100 components to those parameters. By way of non-limiting example from the sample settings above, if a 55% heat output for an oven at 45% excess air is desired for a particular appliance and entered at block 1704, then the corresponding burner parameters as stored in memory could be motor 136 at 3000 rpm, motor 124 at 600 rpm, and motor 110 at 3500 rpm. Controller 112 could recall those parameters from memory and set all three motors to the corresponding values; over time a properly calibrated oven should settle at the 55% heat output.

In some cases a single step transition from a current operating state to a new operating state may not be desirable. A reason for this is that due to differing sizes of the gears in the pumps, atomizing air pump 102, fuel pump 120 and blower 132 may not alter activity at the same rate. For example, fuel pump 120 has small gears that can transition to a new speed quite quickly, whereas blower 132 has larger fan blades that are slower to transition. A single step transition may induce an intermediate operating state in which the burner is operating inefficiently and/or creating other undesirable conditions such as unsafe levels of toxic gas.

A multi-step approach may therefore be used in which burner parameters are adjusted to establish transitional operating states, e.g., maintaining a first set of burner parameters for a first period of time, then transitioning to a second set of burner parameters, etc. Such a multi-step protocol may be based on pre-stored fixed parameters, and/or adaptive that account for current conditions at transitional states.

An example of a transition would be to increase a heat output in an oven from 15% to 70%. As discussed above, a single step protocol would simply select the parameters for the 70% and run those over time. A multi-step protocol would use transitional sets of burner parameters, adjust to each set, run at those parameters for a period of time, then switch to a new set, etc. FIG. 18 shows an example of a table of burner parameters to transition from a 15% heat output to 70%. The process includes 27 different incremental steps, and the burner runs at each step for approximately 1 second.

The specific example of FIG. 18 illustrates two optional features of the embodiments. First, each step preferably limits the maximum change in speed of blower 132 to 100 rpm for each step for a change of 100 rpm/sec, which minimizes inertia concerns. Second, the corresponding fuel speed change is selected to maintain a substantially constant (within a predefined range of variance) fuel speed to blower speed ratio. In this specific example, the ratio is constant in the low 14's, and varies from 14.1 to 14.4.

A variation of the above multi-step protocol example could be to use an algorithm to calculate the steps rather than to store them. For example, the protocol could be to run the burner at the 15% heat output parameters (step 1 of FIG. 18), then add 100 rpm to the blower 132 and 14 rpm to the fuel pump every 1 second for 25 cycles and the remainder in the last cycle.

An adaptive protocol that considers in real time the current state and how to best reach the desired target state or a desired intermediate state could also be used.

The protocol of block 1706 may be fixed, in that it engages and is not responsive to external conditions during its execution; such feedback from the environment would be considered during the maintenance phase at block 1708. However, the protocol may be adaptive, and specifically account for failure to reach the desired target operating state, including expected excess air flow, within an expected period of time. Such "off course" conditions might occur by way of non-limiting example if the fuel being consumed by the burner is not the fuel identified at block 1704 (e.g., due to error in entering the data, mislabeling of the fuel type, mixing of fuels, etc.), or if the environment was colder and syphoning heat (e.g. the burner parameters for an outdoor oven were based on a dry day, but it started to rain and the oven is heating slower than expected. Thus during block 1706 controller 112 can identify a problem and course correct via a new set of burner parameters, or even a new burner protocol, for burner 100.

Preferably, in the presence of an operational oxygen sensor 150, the burner parameters selected for the protocol are based on a target excess air level that is below what would normally be the excess air level for the burner in the absence of an operation oxygen sensor, and particularly below the excess air called for by the corresponding default set of burner parameters. As discussed above, this would not normally be the case in the prior art because burner parameters that induce combustion below such minimum oxygen levels would risk a variance on excess air below 15%. In the embodiments herein, controller 112 utilizes the oxygen sensor 150 to detect such variations and adjust burner parameters to offset them as discussed below.

By way of the non-limiting example above, given variances a burner 100 without access to an operational oxygen sensor 150 would natively run at 50% excess air to avoid the 15% minimum, and the default set of burner parameters are provided for a 50% excess air level. However, oxygen sensor 150 and adjustments in reaction to the same allow the burner 100 to operate at 35% excess air, and a second set of burner parameters are provided for a 35% excess air level. Controller 112 can use that second set of burner parameters to control burner 100 as appropriate for the 35% target, and the maintaining at block 1708 would prevent the amount of excess oxygen from dropping too low.

In context of block 1706, there are a variety of ways to address the amount of excess air. One non-limiting example would be to initially ignore it (either disregarding the oxygen sensor 1650, or not even turning oxygen sensor 1650 on to save power) and set the burner parameters (e.g. FIG. 18) for the target excess air level (e.g., 35%). Another non-limiting example would be to ignore excess air, drive burner 100 at burner parameters for an excess air level above that which would be normally used in the presence of available oxygen sensor (e.g., 50%), and then at some later point (as either part of block 1706 or 1708) adjust the burner parameters to drive toward the target excess air level (e.g., 35%). Another non-limiting example would be to monitor excess air during all or part of block 1706 and make any changes needed along the way to account for unexpected swings in the amount of excess air.

At block 1708, controller 112 transitions from driving/transition operations of block 1706 to maintenance operations to maintain burner 100 at the target operational state with its corresponding target excess air level. This maintenance may be reactive to certain traditional environmental parameters. For example, if the temperature is too high or too low (as detected by other sensors of burner 100 or as reported by the supporting appliance), controller 112 can calculate and/or select new burner parameters to change the heat output to lower or raise the temperature, respectively.

Figure 19:
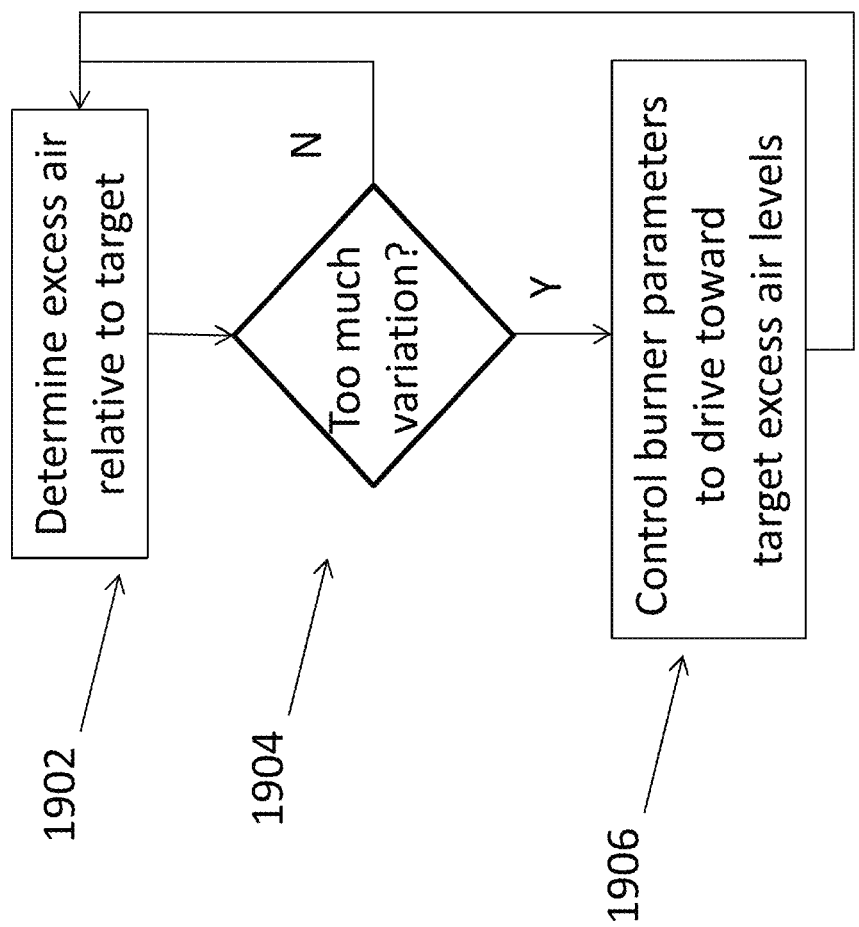
FIG. 19 shows an embodiment of a process for controlling excess air in a burner.

In particular the amount of excess air will not tend to remain stable due to the variances as discussed herein. Referring now to FIG. 19, a process is shown for performing block 1708 with respect to excess air. At block 1902, controller 112 determines the amount of excess air from the output of oxygen sensor 150. This determination can take many forms. The output of the oxygen sensor could be accepted as, and serve as the controlling excess air parameter. The output of the oxygen sensor could be mathematically converted into an amount of oxygen. The output of the oxygen sensor could be mathematically converted into an excess air value. Applicants specifically note that an excess amount of oxygen is a proxy for excess air (amount of excess air=amount of excess oxygen/.209), and references herein to use of excess air refer equally to reliance on amount of excess oxygen. The invention is not limited to how the output of the oxygen sensor is used to determine how much excess air (oxygen) is present.

At block 1904, controller 112 determines whether the amount of excess air has deviated too far from the target excess air. By way of non-limiting example, if the target value is 35%, then variance between 32 and 38 (±3%) may be acceptable. If the actual excess air value is within the allowable tolerance, no responsive action need be taken and control returns to block 1902 for a subsequent oxygen checks. Note the variance may be zero (too far=0%), and the system reacts to any measurable variance from the target excess air level.

If the amount of oxygen is outside of the allowable range at block 1904, then controller 112 adjusts the burner parameters to change the amount of excess air. A non-limiting methodology to adjust excess air is to change the speed of blower 132 via motor 136 to increase or decrease the amount of combustion air provided. If the amount of excess air is too low controller 112 increases the output of blower 132, and if the excess air is too high controller 112 decreases the output of blower 132.

A non-limiting example to adjust blower output is to adjust the speed linearly based on a ratio of the total target air to the total current air. Total air=100%+excess air %. Thus for example, if the target excess air is 35%, then the total target air is 135%. If the current excess air is 25%, then the total current air is 125%.

Controller 112 could change the speed of motor 136 as follows:

New target blower speed=Current blower speed× (total target air/total current air).

By way of non-limiting example, if the blower speed is 5000 rpm, the target excess air is 35% and the current excess air is 25%, then the new blower speed would be:

New blower speed=5000 rpm×1.35/1.25

New blower speed=5400 rpm

Controller 112 would then adjust the blower speed burner parameter to the new value, either as a single step, multi-step/adaptive with smaller increments. A single step protocol would be to make the single change. A multi-step protocol could break up the changes into smaller increments separated by settling time (e.g., increase in 100 rpm increments separated by 1 second of settle time); note a multi-step protocol may result in only a single step if the change is small enough (e.g., <100 rpm).

However, the invention is not so limited to compensating for excess air via changes in blower output, the underlying equation to adjust excess air, and/or the protocols. Also other burner parameters may change. In particular, if the change in the amount of excess air would also cause an excess change in burner 100 heat output (outside of a predetermined variance), controller 112 may adjust the other burner parameters to compensate.

Determination of excess air at block 1902 is based on the presence of an operational oxygen sensor 150. However, some type of system failure, such as failure of oxygen sensor 150, may prevent controller 112 from determining the amount of excess air. Under these circumstances the system cannot safely operate at the target excess air value because the system cannot compensate for variances that would drive the excess air into the range that generates excessive toxic gases. At block 1712 controller 112 would therefore set the burner parameters to a higher excess air, and in particular rely on burner parameters from the default set of burner parameters that meet the remaining desired operating conditions.

The above process can be described in a specific example for burner 100 in an oven. The burner in this example has a target excess air of 35%, and block 1708 maintains that state per the protocol of FIG. 19. Also as a default 50% is selected as the minimum level of excess air in the absence of oxygen sensor 150. If during block 1708 oxygen sensor 150 failed, controller 112 would at block 1712 switch the target output state from 35% to the default 50% value, and at block 1706 controller 112 would drive the burner from 35% to 50% consistent with other system parameters (e.g., the set temperature). Upon reaching that new higher excess oxygen state, controller 112 would maintain that state at block 1708, possibly without making further excess air based adjustments unless and until oxygen sensor 150 was restored. In response to restoration of oxygen sensor 150 controller 112 would at block 1712 select the target output state at target 35% value, and at block 1706 controller 112 would drive the burner from 50% to 35% consistent with other system parameters (e.g., the set temperature).

Figure 20:
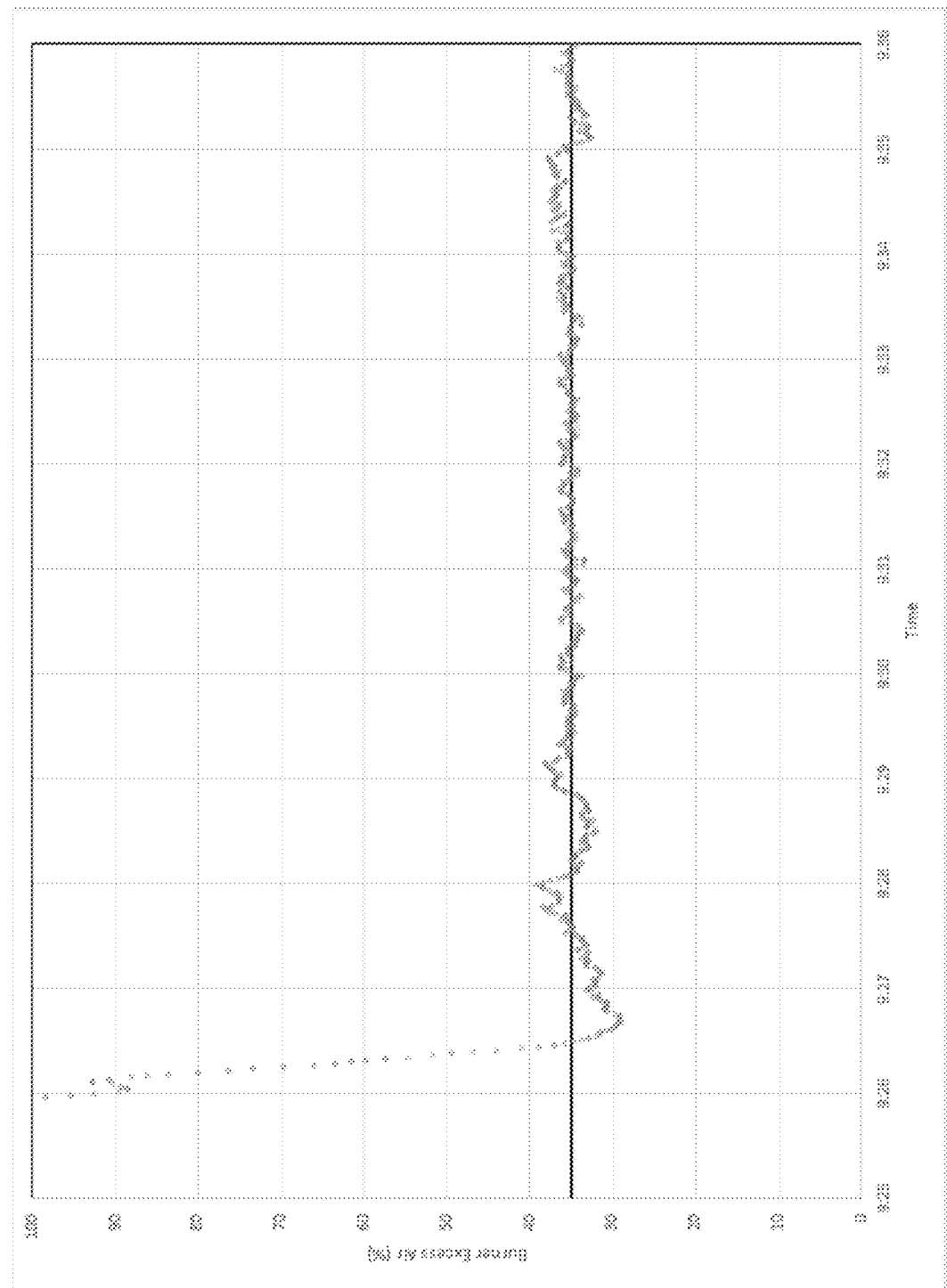
FIG. 20 shows a graph of excess air over time for a burner.

Referring now to FIG. 20, a graph 2002 of excess air over time is shown for running a burner consistent with burner 1300 from startup with a target excess air amount of 35%. Burner parameters consistent with 35% excess air are applied at block 1706 using a multi-step process. The amount of excess air is initially quite high due to the absence of combustion, and will steadily drop during block 1706. Once the excess air reaches about 35% (either via measurement or because a properly calibrated burner 100 should reach that level when the protocols of block 1706 are properly applied) the maintenance phase at block 1708 adjusts burner parameters to maintain as best possible the 35%.

In another embodiment of the invention, oxygen sensor 150 may include separate sensors. If controller 112 identifies any significant inconsistency between the two (e.g., over 10% difference in the readings), one of the oxygen sensors may be providing a false high reading which if relied upon might otherwise inadvertently cause the system to lower the excess air into the unacceptable toxic range. As a precaution, control can pass to block 1712 as discussed above to transition to the default set of burner parameters.

Turndown Extension

"Turndown ratio" in the field of burner refers to the ratio of maximum to minimum heat output. By way of example, if a burner has a maximum output of 100,000 BTU and the turndown ratio is 2:1, then the minimum heat output is 50,000 BTU.

A reason for the minimum in the AIRTRONIC is that the amount of atomizing air was not adjustable and heat output was primarily based on controlling the fuel flow; if the fuel flow dropped too low, the flame would extinguish. The minimum heat output thus generally corresponds to the lower amount of heat output at which the burner can still safely and consistently produce flame.

Figure 21:
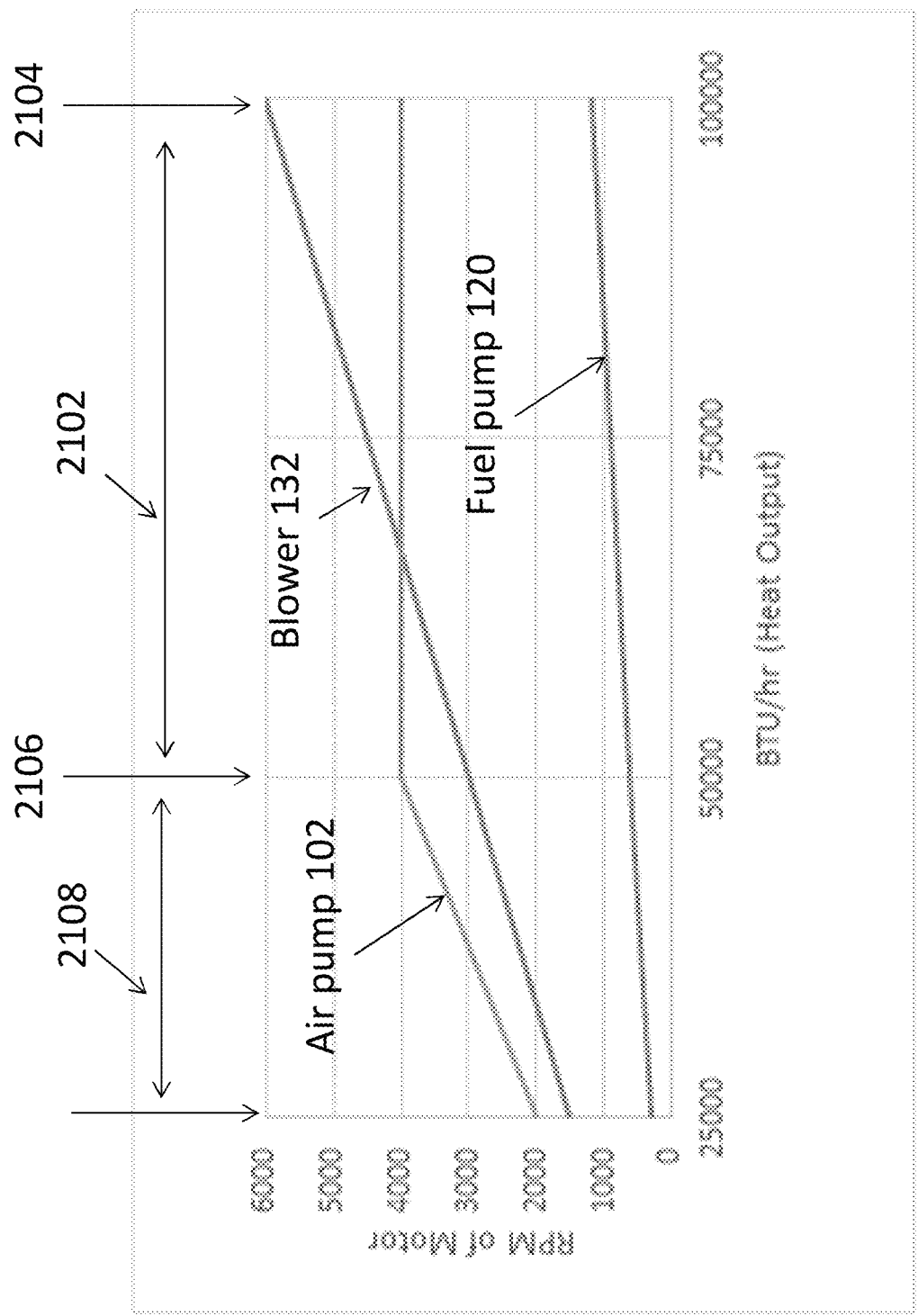
FIG. 21 shows a graph of burner parameter control.
Figure 22:
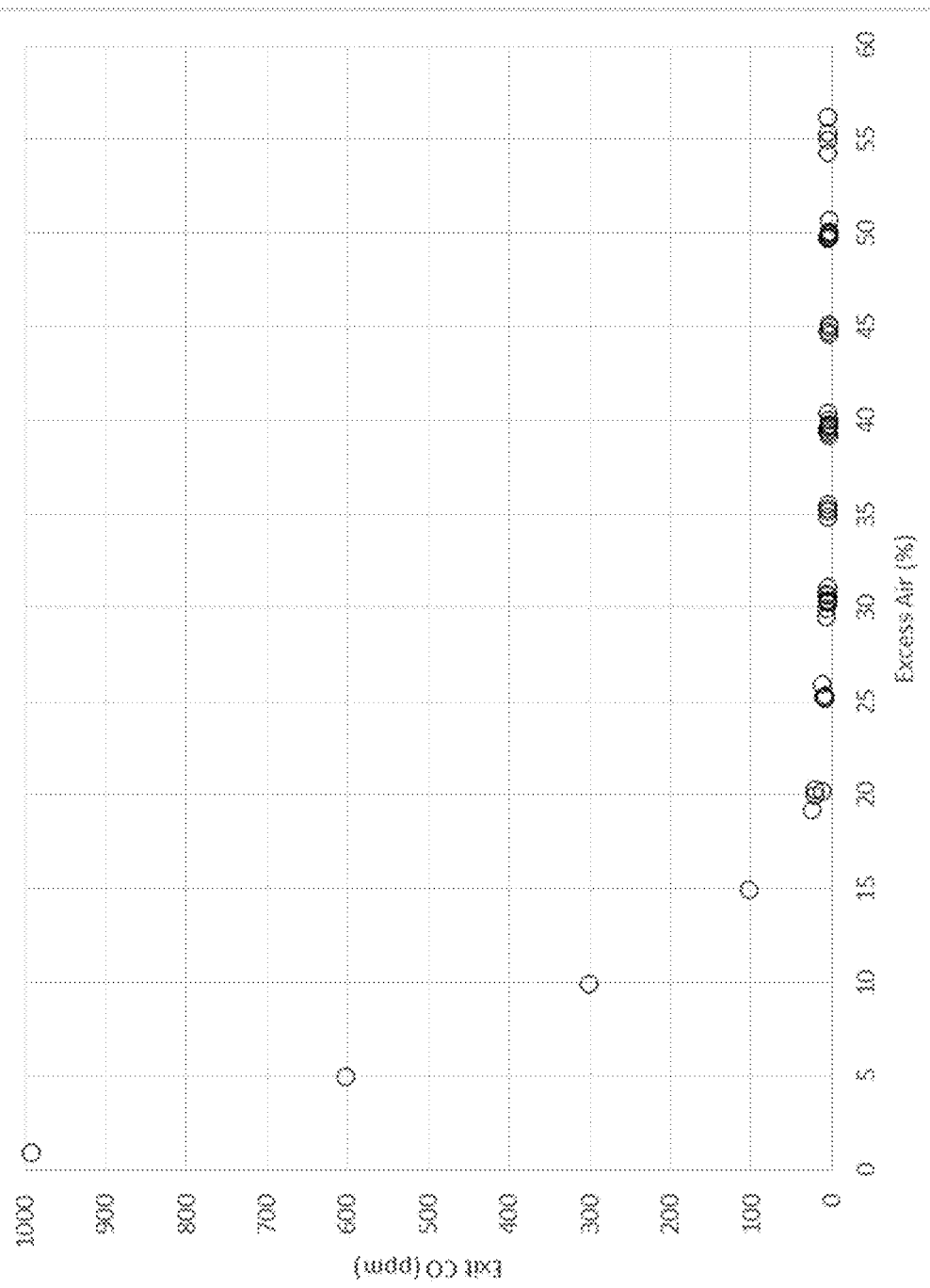
FIG. 22 shows a graph of carbon monoxide emissions of a burner at different excess air levels.

Referring now to FIG. 21, an embodiment is shown to control burner 100 to allow it to maintain a flame at a lower heat output, thereby increasing the turndown ratio. The methodology is for controller 112 to control the burner 100 over a first range 2102 and a second range 2108. In the first range 2102 the speed of air pump 102 is maintained substantially constant (absolute ±15% or less) while the fuel pump increases or decreases to change the heat output; blower speed also increases and decreases, although this relates more to the amount of excess air rather than heat output.

First range 2102 is defined at one end as the maximum heat output 2104 of the burner, and at the other end by the minimum heat output 2106 that the burner 100 can reliably maintain with the substantially constant output of air pump 102. FIG. 21 shows an example of a minimum and maximum of 100 k BTU and 50 kBTU for burner 100, which is consistent with the AIRTRONIC. Operating burner 100 at a heat output below that minimum heat output 2106 under the above control parameters would cause the flame to become unstable and eventually extinguish.

In the second range 2108, the speed of air pump 102 falls below the substantially constant levels of the first range, and increases and decreases along with fuel pump 120. The reduction in speed of air pump 102 in this manner allows the burner 100 to safely and reliably maintain a flame at lower heat output levels.

In the example of FIG. 21, in the second region the burner 100 can go as low as 25 k BTU, which is significantly lower than the 50 k of the AIRTRONIC. The turndown ratio of burner 100 is 4:1, which is twice that of the AIRTRONIC.

The values of FIG. 21 are non-limiting examples, and the invention is not so limited.

The embodiments herein discuss an oxygen sensor to measure excess oxygen and use that in the decision making by controller 112. However, other sensor types could be used with controller 112 programmed to rely upon the same. By way of non-limiting examples, carbon monoxide or carbon dioxide sensors could also be used, with controller 112 programmed to target and default burner parameters to meet and maintain levels of carbon monoxide or carbon dioxide in the output of the burners. Combinations of different sensors could be used, and in particular block 1712 could be activated if the different types of sensors provided conflicting or different information outside of a predetermined variance.

The embodiments herein are directed to use of burner with cooking and heating appliances. However, the invention is not so limited, and other environments could be used, such as residential heating, industrial space heating and auxiliary heating.

Figure 23:
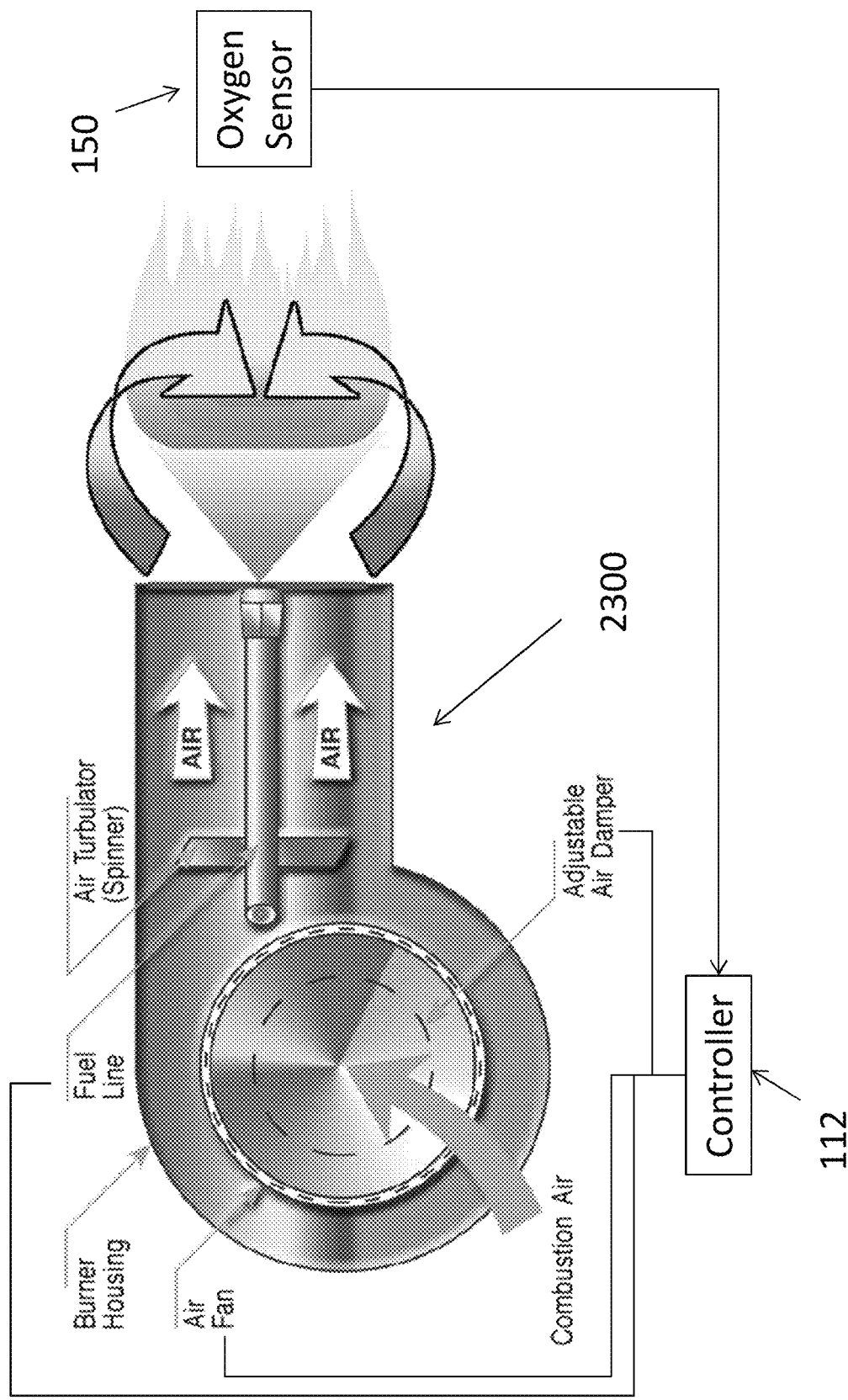
FIG. 23 shows another embodiment of the invention.

The above embodiments have been discussed in the context of atomizing burners. However, the invention is not so limited, and other types of burners may be used. By way of non-limiting example, FIG. 23 shows a high pressure burner 2300 with a burner housing, an air fan, an adjustable air dampener and a fuel line. Controller 112 is programmed to control the output of burner 2300 via control of the air fan, the adjustable air damper and/or the fuel line; control of the air fan and/or the adjustable air damper would control the flow of air for combustion, and control of the fuel line would control the flow of fuel. Oxygen sensor 150 located downstream from the combustion would provide an output signal to controller 112, which controller 112 would use as a feedback signal to control the amount of excess air as set forth herein. Controller 112 for FIG. 23 would have its own sets of burner parameters as specific to burner 2300, and in this specific example such parameters would not include atomizing air as a parameter as burner 2300 does not utilize atomized air.

The specification and drawings are to be regarded in an illustrative rather than a restrictive sense. It will, however, be evident that various modifications and changes may be made thereunto without departing from the broader spirit and scope of the invention as set forth in the claims.

What is claimed is:

1. A burner, comprising:
  an atomizing chamber;
  a flame tube in front of the atomizing chamber, adapted to direct combusting fuel introduced by the atomizing chamber along an interior of the flame tube; and
  a controller programmed to independently control rate of fuel flow to the atomizing chamber, rate of atomizing air flow to the atomizing chamber, and rate of combustion air to the flame tube, the controller being programmed to perform operations comprising:
regulating, based on output of a gas sensor, at least the rate of combustion air to the flame tube to substantially maintain a first predetermined amount of excess air in the flame tube;
increasing, in response to an absence of reliable output from the gas sensor, the at least the rate of combustion air to the flame tube to transition to a second predetermined amount of excess air in the flame tube, the second predetermined amount of air being higher than the first predetermined amount of excess air.

2. The burner of claim 1, the controller being further programmed to perform operations comprising:
regulating, after the increasing, at least the rate of combustion air to the flame tube to maintain the second predetermined amount of excess air in the flame tube.

3. The burner of claim 1, wherein the gas sensor is an oxygen sensor.

4. The burner of claim 1, wherein the gas sensor is a carbon monoxide or carbon dioxide sensor.

5. The burner of claim 1, further comprising:
a non-transitory computer readable medium storing at least a target set of burner parameters and a corresponding default set of burner parameters,
the regulating comprises:
first driving the burner based on the target set of burner parameters in the presence of reliable output from the gas sensor; and
second driving the burner based on the corresponding default set of burner parameters in the absence of reliable output from the gas sensor;
wherein the target set of burner parameters refers to a set of burner parameters to be applied to the burner under a first set of conditions in the presence of reliable output from the gas sensor, the target set of burner parameters including the first predetermined amount of excess air; and
wherein the corresponding default set of burner parameters refers to a set of burner parameters to be applied by the burner in the absence of reliable output from the gas sensor to, the target set of burner parameters including a second predetermined amount of excess air higher than the first predetermined amount of excess air.

6. The burner of claim 5, the regulating further comprising:
first transitioning, in response loss of reliable output from the gas sensor, from the first driving to the second driving.

7. The burner of claim 5, the regulating further comprising:
second transitioning, in response resumption of reliable output from the gas sensor, from the second driving to the first driving.

8. The burner of claim 5, the regulating further comprising:
detecting that the amount of excess air flow in the flame tube deviates from the first predetermined amount of excess air by more than a predetermined tolerance; and
changing, in response to the detecting, at least the rate of combustion air to drive the amount of excess air in the flame tube toward the first predetermined amount of excess air.

9. The burner of claim 8, where in the predetermined tolerance is zero.

10. The burner of claim 8, wherein the predetermined tolerance is absolute ±3%.

11. The burner of claim 8, wherein the first predetermined amount of excess air is about 35%.

12. The burner of claim 8, wherein the second predetermined amount of excess air is about 50%.

13. The burner of claim 1, wherein the gas sensor is located in the flame tube.

14. The burner of claim 1, further comprising:
a heating appliance connected to the burner and configured to receive heat of combustion from the burner;
the gas sensor being located in the heating appliance.

15. A burner, comprising:
an atomizing chamber;
a flame tube in front of the atomizing chamber, adapted to direct combusting fuel introduced by the atomizing chamber along an interior of the flame tube; and
a blower that provides combustion air to the flame tube;
a controller programmed to independently control rate of fuel flow to the atomizing chamber, rate of atomizing air flow to the atomizing chamber, and rate of combustion air to the flame tube, the independently controlling the rate of combustion air to the flame tube comprises controlling speed of the blower the controller being programmed to perform operations comprising:
regulating, based on output of a gas sensor, at least the rate of combustion air to the flame tube to substantially maintain a first predetermined amount of excess air in the flame tube; and
increasing, in response to an absence of reliable output from the gas sensor, the speed of the blower to transition to a second predetermined amount of excess air in the flame tube that is higher than the first predetermined amount of excess air.

16. The burner of claim 15, the controller being further programmed to perform operations comprising:
regulating, after the increasing, the speed of the blower to maintain the second predetermined amount of excess air in the flame tube.

17. The burner of claim 15, wherein the increasing the speed of the blower comprises:

new blower speed=prior blower speed×(second predetermined excess air flow/first predetermined excess air flow).

18. A method for controlling a burner, the burner including an atomizing chamber, a flame tube in front of the atomizing chamber, adapted to direct combusting fuel introduced by the atomizing chamber along an interior of the flame tube, and a controller programmed to independently control rate of fuel flow to the atomizing chamber, rate of atomizing air flow to the atomizing chamber, and rate of combustion air to the flame tube, the method comprising:
first regulating, based on output of a gas sensor, at least the rate of combustion air to the flame tube to substantially maintain a first predetermined amount of excess air in the flame tube;
increasing, in response to an absence of reliable output from the gas sensor, the at least the rate of combustion air to the flame tube to transition to a second predetermined amount of excess air in the flame tube, the second predetermined amount of air being higher than the first predetermined amount of excess air; and
second regulating, after the increasing, at least the rate of combustion air to the flame tube to maintain the second predetermined amount of excess air in the flame tube.

19. The method of claim 18, further comprising:
storing at least a target set of burner parameters and a corresponding default set of burner parameters,
the first regulating comprises first driving the burner based on the target set of burner parameters in the presence of reliable output from the gas sensor; and
the second regulating comprises second driving the burner based on the corresponding default set of burner parameters in the absence of reliable output from the gas sensor;
wherein the target set of burner parameters refers to a set of burner parameters to be applied to the burner under a first set of conditions in the presence of reliable output from the gas sensor, the target set of burner parameters including the first predetermined amount of excess air; and
wherein the corresponding default set of burner parameters refers to a set of burner parameters to be applied by the burner in the absence of reliable output from the gas sensor to, the target set of burner parameters including a second predetermined amount of excess air higher than the first predetermined amount of excess air.

20. The method of claim 18, further comprising:
decreasing, in response to a resumption of reliable output from the gas sensor, the at least the rate of combustion air to the flame tube to transition to the first predetermined amount of excess air in the flame tube; and
resuming, after the decreasing, the first regulating.

* * * * *